United States Patent
Van De Velde et al.

(10) Patent No.: US 10,938,598 B2
(45) Date of Patent: Mar. 2, 2021

(54) APPARATUS, SYSTEM AND METHODS FOR NATIVE BRIDGED COMMUNICATION IN CELLULAR ACCESS NETWORK

(71) Applicant: Alcatel Lucent, Nozay (FR)

(72) Inventors: Thierry Van De Velde, Antwerp (BE); Dietrich Zeller, Stuttgart (DE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/754,507

(22) PCT Filed: Aug. 31, 2016

(86) PCT No.: PCT/EP2016/070497
§ 371 (c)(1),
(2) Date: Feb. 22, 2018

(87) PCT Pub. No.: WO2017/045921
PCT Pub. Date: Mar. 23, 2017

(65) Prior Publication Data
US 2018/0254919 A1    Sep. 6, 2018

(30) Foreign Application Priority Data
Sep. 17, 2015    (EP) .................................... 15306442

(51) Int. Cl.
*H04L 12/26*  (2006.01)
*H04L 12/46*  (2006.01)
*H04W 76/16*  (2018.01)
*H04W 88/16*  (2009.01)
(Continued)

(52) U.S. Cl.
CPC ........ *H04L 12/462* (2013.01); *H04L 12/4625* (2013.01); *H04L 12/4633* (2013.01);
(Continued)

(58) Field of Classification Search
USPC ................................ 370/229, 235, 252, 329
See application file for complete search history.

(56) References Cited

U.S. PATENT DOCUMENTS

2004/0105434 A1* 6/2004 Baw ...................... H04W 84/12
                                                              370/355
2012/0094660 A1* 4/2012 Radulescu ............ H04W 24/10
                                                              455/434
(Continued)

FOREIGN PATENT DOCUMENTS

| CN | 101213817 A | 7/2008 | |
| EP | 2166735 A1 * | 3/2010 | ....... H04L 29/12839 |
| WO | WO-2014077352 A1 | 5/2014 | |

OTHER PUBLICATIONS

Saito, A Virtual MAC Address Scheme for Mobile Ethernet, Spring 2005, pp. 99-109. (Year: 2005).*

(Continued)

*Primary Examiner* — Phuongchau Ba Nguyen
(74) *Attorney, Agent, or Firm* — Harness, Dickey & Pierce, P.L.C.

(57) ABSTRACT

A hybrid access gateway (HAG) apparatus for native bridged communication in a communication network may include an upstream interface configured for receiving downlink Open Systems Interconnection (OSI) layer 2 traffic in the communication network; at least one downstream cellular coupling interface configured to be communicatively coupled to a user equipment (UE) represented by an OSI layer 2 address via a cellular access network (e.g. a Radio Access Network or RAN) of the communication network; an inspection module configured for inspecting an OSI layer 2 header of the received traffic; and a direction module configured for, based on the inspected OSI layer 2 header, directing the received traffic to the user equipment via the at least one downstream cellular coupling interface.

10 Claims, 13 Drawing Sheets

(51) Int. Cl.
   H04W 92/02      (2009.01)
   H04L 12/721     (2013.01)
   H04L 29/08      (2006.01)
   H04W 74/02      (2009.01)

(52) U.S. Cl.
   CPC ............ *H04L 45/66* (2013.01); *H04W 76/16* (2018.02); *H04W 88/16* (2013.01); *H04W 92/02* (2013.01); *H04L 69/324* (2013.01); *H04W 74/02* (2013.01)

(56) References Cited

U.S. PATENT DOCUMENTS

| | | | |
|---|---|---|---|
| 2014/0077352 A1 | 3/2014 | Leal et al. | |
| 2016/0127897 A1* | 5/2016 | Lee ..................... | H04L 9/3247 713/176 |
| 2016/0262080 A1* | 9/2016 | Rinne .................. | H04W 40/02 |
| 2016/0380884 A1* | 12/2016 | Sarikaya ............. | H04W 8/08 370/389 |

OTHER PUBLICATIONS

International Search Report PCT/ISA/210 for International Application No. PCT/EP2016/070497 dated Nov. 2, 2016.
Written Opinion of the International Searching Authority PCT/ISA/237 for International Application No. PCT/EP2016/070497 dated Nov. 2, 2016.
Yoshia Saito et al. "A Virtual MAC Address Scheme for Mobile Ethernet". Wireless Personal Communications vol. 35. Kluwer Academic Publishers—Springer. 2005. pp. 99-109.
Koichi Ishibashi et al. "A Proposal of Fast Vertical Handover by Virtual MAC Address Scheme on Mobile Ethernet". Local and Metropolitan Area Networks. The 13th IEEE Workshop, Mill Valley, CA. Apr. 2004. pp. 145-149.
Japanese Office Action dated Jan. 29, 2019 for JP Application No. 2018-514265.
Office Action dated Mar. 11, 2020, issued in corresponding European Patent No. 15306442.3.
"Access network—Wikipedia" Jun. 2015, retrieved from the internet: https://en.wikipedia.org/w/index.php?title=Access_network&oldid=665980843 [retrieved on Mar. 4, 2020].
Chinese Office Action dated Mar. 25, 2020, issued in corresponding Chinese Application No. 201680053856.2.
Indian Office Action dated May 15, 2020 issued in corresponding Indian Application No. 201847007183.
Chinese Office Action dated Sep. 9, 2020 issued in corresponding Chinese Application No. 201680053856.2 (with English summary).

* cited by examiner

APPARATUS, SYSTEM AND METHODS FOR NATIVE BRIDGED COMMUNICATION IN CELLULAR ACCESS NETWORK

CROSS-REFERENCE TO RELATED APPLICATIONS

This application is a national phase under 35 U.S.C. § 371 of PCT International Application No. PCT/EP2016/070497 which has an International filing date of Aug. 31, 2016, which claims priority to European Application No. 15306442.3, filed Sep. 17, 2015, the entire contents of each of which are hereby incorporated by reference.

FIELD OF THE INVENTION

The field of the invention relates to communication networks. Particular embodiments relate to a hybrid access gateway apparatus, a hybrid access controller apparatus, a communication network system, a method for providing native bridged access in a communication network, a method for controlling native bridged access in a communication, and a computer program product therefor.

BACKGROUND

Today no native bridged communication exists within cellular access network (e.g. Radio Access Networks/RAN), between cellular access networks and non-cellular access networks (e.g. WLAN), nor between cellular access networks and external Framed Data Networks (FDN, e.g. Ethernet networks).

Consequently, all communication by cellular wireless (2G/3G/Long Term Evolution) user equipment (UE) is routed: an EPS (Evolved Packet System) session or Packet Data Network (PDN) connection must be established between the User Equipment (UE) and the Evolved Packet Core (EPC), and the PDN Gateway (PGW) routes all traffic to/from the UE. Extensive resources are consumed in the EPC; the EPS session establishment process is tedious and relatively slow. Open Systems Interconnection data link layer (OSI layer 2) overlays initiated by the UE on top of connection-oriented communication (PDN connections) are known, but these remain fundamentally routed and are not natively bridged. Today's cellular access networks and EPC fundamentally offer a routed OSI layer 3 service (IP) to the UE, not a bridged or switched OSI layer 2 service.

Today, the cellular UE cannot be reached from equipment in a Framed Data Network (FDN, e.g. Ethernet, VPLS (Virtual Private LAN Service) or WLAN) without establishing an overlay or tunnel between the UE and the PGW.

SUMMARY

It is an object of embodiments of the present invention to allow native bridged communication for user equipment in an access network of a communication network, for example in order to decrease complexity and latency of communication in a communication network (for example a 5G communication network as defined by the $3^{rd}$ Generation Partnership Project (3GPP) or Next Generation Mobile Networks (NGM) Alliance).

According to a first aspect of the invention, there is provided a hybrid access gateway (HAG) apparatus for native bridged communication in a communication network, comprising:

an upstream interface configured for receiving downlink Open Systems Interconnection (OSI) layer 2 traffic in said communication network;

at least one downstream cellular coupling interface configured to be communicatively coupled to a user equipment (UE) represented by an OSI layer 2 address via a cellular access network (e.g. a Radio Access Network or RAN) of said communication network;

an inspection module configured for inspecting an OSI layer 2 header of said received traffic; and a direction module configured for, based on said inspected OSI layer 2 header, directing said received traffic to said user equipment via said at least one downstream cellular coupling interface.

In this manner, instead of routing communication over OSI layer 3 (L3), but by allowing native bridged communication over OSI layer 2 (L2), which can be performed at higher speed, lower energy consumption and lower cost, the complexity and latency of communication in the mobile communication network can be reduced. The native bridged communication may for example be between a UE and one or more other UE, not only attached to the same cellular access network (e.g. a radio access network or RAN) or to a connected non-cellular access network (e.g. WLAN, Ethernet or fixed broadband) but also between cellular UE and non-wireless Framed Data Networks (FDN) or Packet Data Networks (PDN). Thus, said receiving may comprise receiving from a reference point upstream (as seen from the hybrid access gateway) and additionally or alternatively receiving from a reference point downstream (again as seen from the hybrid access gateway).

It is computationally more efficient to perform such interconnections at OSI layer 2, in an equipment directly connected to the cellular access network, and to inspect OSI layer 2 headers rather than OSI layer 3 headers.

Because the hybrid access gateway (HAG) apparatus allows a bridging or switching point much closer to the UE, for communication between different UE or between UE and FDN/PDN, than with solutions relying on L2 (layer 2) over IP (Internet Protocol) tunnels (thus non-native) to the PGW or to gateways on the SGi side of the PGW (i.e. in the PDN to which the PGW is connected)—in other words, native OSI layer 2 switching close to the UE and Evolved Node B (ENB or eNodeB)—complexity can be reduced, UE throughput and latency improved. Furthermore, native bridged communication (i.e. without establishing a PDN connection) is more rapid to establish, consumes no EPC (Evolved Packet Core) resources and less UE battery power, and presents other benefits over EPC-based communication (i.e. with establishing a PDN Connection through the PDN Gateway).

Another issue is inter-UE communication between two (or more) UE connected to the same cellular access network. The scalability and security issues are such that inter-UE communication requires either requires both UE to be connected to an IP Virtual Private Network (VPN) within which communication can be permitted, or requires similar technologies such as IP Access Control Lists (ACLs). These logical constructs at OSI layer 3 consume so much resources at the PGW that not enough small VPNs or ACLs can be established to offer, say, one per family. Consequently at the PGW the 3G/4G network users cannot safely be interconnected to their Universal Plug and Play/Digital Living Network Alliance (UPNP/DLNA) home environment, for example.

Thus, local native bridged communication between cellular UE or between cellular UE and UE connected to a con-cellular access network is possible without requiring routing at the PGW—in fact without requiring any EPC resources at all, thereby strongly reducing round-trip delay, packet loss, jitter, fragmentation, computing resources consumption and cost. It is possible to establish native bridged communication in a controlled and secure fashion, without requiring the EPC or gateways (e.g. TWAG) on the SGi side of the PGW. 5G and native bridged 4G can be introduced with little or no impact on today's EPC and surrounding systems (e.g. Home Subscriber Server or HSS).

Furthermore, this allows combining both communication modes (routed and native bridged) into a single UE session.

In known techniques, IPv4 addresses and IPv6 prefixes cannot be granted by respectively a DHCP (Dynamic Host Configuration Protocol) server and SLAAC (Stateless address auto-configuration) enabled router on a cellular UE; all IPv4 addresses and global IPv6 prefixes must be granted by the PGW or by respectively servers and routers in the external Packet Data Network (PDN, e.g. Internet Protocol (IP) network) to which the PGW is connected. Today, the cellular operator must be the Internet Service Provider (ISP) of the UE, or at least have a wholesale agreement and interconnection with the ISP for that UE. The UEs cannot assign network layer (i.e. OSI layer 3) addresses themselves. Neither can the UEs run different OSI layer 3 protocols than IP, such as Multiprotocol Label Switching (MPLS).

In contrast, the hybrid access gateway offers the choice to users of cellular (wireless) access networks to run a different network layer (i.e. OSI layer 3) protocol than IP, for example MPLS, thereby using 4G or 5G segments to expand existing MPLS networks.

Additional advantages of using the hybrid access gateway are inter alia permanent reachability (i.e. the quality of being able to be communicatively coupled) of the UE from external FDN/PDN since no PDN connection must be established in order to reach the UE (PDN connections are subject to idle timers and absolute session time-outs); offering direct access to local content to inbound roamers on a visited cellular access network (e.g. a RAN) or visited non-cellular access network (e.g. a WLAN), without routing this content through the PGW, which is most often in the foreign Home network, and replacing paging procedures (control plane) with in-band broadcast traffic.

Furthermore, the skilled person will appreciate that the downstream cellular coupling interface and the direction module can be logically combined to form a routing element, such as a Virtual Router and Switch, implemented as a separate hardware device or (preferably) as an integrated software product.

Although the present application uses terminology based on Long Term Evolution and provisional 5G to facilitate comprehension, the skilled person will nevertheless understand that it is not limited to that particular technology, and that it may in particular also be applicable for other current or future mobile communication technologies.

Thus, a 'reference point' is understood to refer to a conceptual link that connects two groups of functions that reside in different functional entities of the communication network. A number of reference points have been defined by the 3GPP. Further, an eNodeB is understood to refer to an access node—even an access node in other generations of mobile communication technology, the Evolved Packet Core is understood to refer to a core network, the E-UTRA(N) is understood to refer to an access network (itself potentially comprising multiple smaller access networks), etc.

In a preferred embodiment, the hybrid access gateway comprises a table configured for storing associations between a number of user equipments including said user equipment and a number of OSI layer 2 addresses respectively representing said number of user equipments.

In this manner, by keeping track of the OSI layer 2 addresses (e.g. Media Access Control addresses), the hybrid access gateway (or in particular its direction module) can direct downstream traffic towards the intended user equipment via a cellular access network or via a cellular access network and a non-cellular access network, in both cases using native bridged communication.

In another preferred embodiment, said downstream cellular coupling interface is configured to be communicatively coupled to said user equipment via a cellular access network comprising a shared or common channel or radio access bearer (RAB) supporting concurrent, preferably contention-based, access by multiple user equipments.

In this manner, the cellular UE can vie for (i.e. compete eagerly with each other in order to obtain) radio access rather than rely on a dedicated radio access bearer (per user equipment and traffic class). Consequently, communication from the UE can be initiated more quickly.

In an embodiment, said inspection module is configured for inspecting said OSI layer 2 header by performing 4-tuple Shallow Frame Inspection on a source MAC (Media Access Layer) address, a destination MAC address, a protocol indication, and a bridged subnetwork identification; wherein said bridged subnetwork identification is an identification of a bridged subnetwork of said communication network; wherein said bridged subnetwork is a virtual network configured to allow inter-UE communication at OSI layer 2 in bridged (a.k.a. switched) mode by UE which are attached to the same bridged subnetwork, and to disallow inter-UE communication at OSI layer 2 in bridged mode by UE which are attached to a different bridged subnetwork.

In a particular embodiment, said hybrid access gateway is configured for allowing Broadcast, Unknown unicast, and Multicast (BUM) traffic on at least one bridged subnetwork of said communication network.

In an embodiment, said inspection module is configured for inspecting an OSI layer 2 payload of said received traffic. By analogy to Deep Packet Inspection, this operation of inspecting the received traffic beyond the OSI layer 2 header may be denoted as Deep Frame Inspection (DFI).

In an embodiment, the user equipment (UE) connected to said cellular access network is identified by an OSI layer 2 address (denoted as cellular MAC address: cMAC) which is derived from a temporary identifier for said UE, such as the Globally Unique Temporary Identifier (GUTI), and which preferably comprises the least significant bytes of said temporary identifier/GUTI, for example up to and including its MMEC (Mobile Management Entity Code). In a further developed exemplary embodiment, the same UE in addition is also connected to a non-cellular access network of said communication network where it is identified by another OSI layer 2 address (denoted as non-cellular MAC address: ncMAC), such as a built-in WLAN NIC (Network Interface Controller) MAC address.

In a yet further developed embodiment, said inspection module is configured for associating a virtual MAC address (vMAC) representing said user equipment (UE) with said cMAC address or with said cMAC address and said ncMAC address of said user equipment (UE) in a or said table, based on higher-level authorization of said user equipment (UE) (e.g. from an Authentication, Authorization and Accounting server, and preferably relayed by a hybrid access controller (HAC) as will be described below) in said communication network.

In an embodiment, said direction module is configured for directing said received traffic to the cMAC address and optionally also to the ncMAC address according to a distribution algorithm which is configured to prevent out-of-sequence delivery of said received traffic at said user equipment (UE). In a specific embodiment, said direction module is configured for said directing to the cMAC address and optionally also to the ncMAC address is based on said associating.

In an embodiment, said inspection module is configured for detecting from upstream traffic from said UE that the UE has been admitted to said cellular access network, and reconfiguring said direction module to direct downstream traffic to said UE. Optionally, in that embodiment, said inspection module is configured for notifying a higher-level server in said communication network (e.g. a hybrid access controller as will be described below) of said detecting.

In this manner, the hybrid access gateway allows detecting UE mobility events by inspecting layer 2 traffic rather than by relying on control plane signaling.

In an embodiment, said inspection module is configured for detecting from upstream traffic from said UE that said UE has been admitted to a non-cellular access network, and reconfiguring said direction module to direct downstream traffic to said UE. Optionally, in that embodiment, said inspection module is configured for notifying a higher-level server in said communication network (e.g. a hybrid access controller as will be described below) of said detecting.

In this manner, the hybrid access gateway allows detecting UE mobility events by inspecting layer 2 traffic rather than by relying on control plane signaling.

In an embodiment, said inspection module is configured for detecting from upstream traffic that said UE has moved to a different part of said cellular access network or to a different part of said non-cellular network and reconfiguring said direction module to direct downstream traffic to the UE. Optionally, in that embodiment, said inspection module is configured for notifying a higher-level server in said communication network (e.g. a hybrid access controller as will be described below) of said detecting.

In this manner, the hybrid access gateway allows executing handover without relying on control plane signaling.

In an embodiment, said inspection module is configured for detecting from upstream traffic that an attacking user equipment is attempting to impersonate another UE by spoofing its layer 2 address or its layer 3 address.

In this manner, the hybrid access gateway can improve security by detecting attacks launched from a spoofed address which has not legitimately been assigned to said attacking user equipment.

In an embodiment, said direction module comprises a multiplexer (MUX) configured for directing said received traffic to said user equipment (UE) via a cellular access network and a non-cellular access network of said communication network concurrently.

By concurrently directing received traffic according to the inspected header over two or more of the interfaces, the multiplexer (MUX) allows concurrent use of a cellular access network and a non-cellular access network by a single UE (thereby increasing reliability and throughput in areas of dual coverage).

In another embodiment, said multiplexer (MUX) is configured for directing part of said received traffic to the user equipment via a cellular access network on which dedicated logical channels or radio access bearers (RAB) are established, and part of said received traffic via a or said shared or common channel or RAB with concurrent, preferably contention-based, access by multiple UE. In a further developed embodiment, said multiplexer (MUX) is configured for directing said parts of said received traffic based on one or more types of said received traffic.

In this manner, the hybrid access gateway allows utilizing the most appropriate logical channel for each traffic type.

In an embodiment, said hybrid access gateway comprises a cryptographic module configured for storing at least one pairwise master key (PMK) associated with a user equipment (UE) connected to said communication network; and configured for encrypting and decrypting traffic to and from said user equipment using said stored at least one pairwise master key. In an example embodiment, the at least one PMK is derived according to the Institute of Electrical and Electronics Engineers (IEEE) 802.11i standard. In a further developed embodiment, the at least one PMK is derived by an Authentication, Authorization and Accounting (AAA) server of said communication network. In another example embodiment, the at least one PMK results from the authentication procedure of a cellular user equipment (UE) according to $3^{rd}$ Generation Partnership Project (3GPP) standards.

In this manner, the hybrid access gateway allows encrypting (ciphering) the communication to and from the UE without relying on encryption in elements of the cellular or non-cellular access network. This results in a lower number of Radio Resource Control (RRC) and Non-Access Stratum (NAS) messages between the UE, the eNodeB/RRC/vRRC ((virtual) Radio Resource Controller) and Mobility Management Entity (MME), and hence many more UE can be served by that same eNodeB/RRC/vRRC than if it would need to obtain per-UE ciphering keys and apply ciphering.

In an embodiment, said cryptographic module is configured for using the Institute of Electrical and Electronics Engineers (IEEE) 802.1AE (a.k.a. MACsec) protocol for said encrypting and said decrypting. In another embodiment, said cryptographic module is configured for using the Wi-Fi Alliance Wi-Fi Protected Access II (a.k.a. WPA2) protocol for said encrypting and decrypting. In another embodiment, said cryptographic module is configured for using a protocol standardized by the $3^{rd}$ Generation Partnership Project (3GPP).

In an embodiment, said hybrid access gateway comprises:
a GPRS (General Packet Radio Service) Tunneling Protocol User Plane (GTP-U) module coupled to an Evolved Packet Core (EPC); and configured for:
encapsulating uplink OSI layer 3 traffic outbound towards said EPC; and
decapsulating downlink GTP-U traffic inbound from said EPC and forwarding said decapsulated downlink GTP-U traffic to said inspection module.

According to another aspect of the invention, there is provided a hybrid access controller (HAC) apparatus for hybrid access control in a communication network,
wherein said hybrid access controller is configured for being communicatively coupled to and for controlling a hybrid access gateway according to any of the embodiments as described above, by setting up and controlling:
an upstream interface of said hybrid access gateway, which is configured for receiving downlink Open Systems Interconnection (OSI) layer 2 traffic in said communication network;
at least one downstream cellular coupling interface of said hybrid access gateway, which is configured to be communicatively coupled to a user equipment (UE) represented by an OSI layer 2 address via a cellular access network (e.g. a Radio Access Network or RAN) of said communication network;

an inspection module of said hybrid access gateway, which is configured for inspecting an OSI layer 2 header of said received traffic; and a direction module of said hybrid access gateway, which is configured for, based on said inspected OSI layer 2 header, directing said received traffic to said user equipment via said at least one downstream cellular coupling interface.

The skilled person will understand that the hereinabove described considerations and advantages also apply for embodiments of the hybrid access controller, mutatis mutandis.

In a preferred embodiment, the hybrid access controller comprises:
a Mobility Management Function (MMF) module configured for performing the tasks of a 3GPP ($3^{rd}$ Generation Partnership Project) Mobility Management Entity.

In another preferred embodiment, the hybrid access controller comprises:
a Serving Gateway Function (SGF) module configured for performing the tasks of a 3GPP Serving Gateway:

In a particular embodiment, the hybrid access controller comprises:
a Trusted Wireless Access Gateway (TWAG) module configured for performing the tasks of a 3GPP TWAG within a Trusted WLAN Access Network (TWAN); and
a Trusted Wireless Authentication Proxy (TWAP) module configured for performing the tasks of a 3GPP TWAP within a Trusted WLAN Access Network (TWAN).

Thus, embodiments of the hybrid access controller introduce Trusted WLAN access without the need for a stand-alone or monolithic TWAG/TWAP.

In another embodiment, the hybrid access controller comprises:
a Broadband Network Gateway (BNG) module configured for performing the tasks of a 3GPP Broadband Network Gateway.

In another embodiment, the hybrid access controller comprises:
a Small Cells Gateway Function (SCGF) module configured for performing the tasks of a Small Cells Gateway (e.g. Alcatel-Lucent's Small Cells Gateway).

In a further developed embodiment, said coupling occurs via a reference point (F7) available for standardization by the $3^{rd}$ Generation Partnership Project (3GPP), Open Networking Forum (ONF) or Next Generation Mobile Alliance (NGMA).

In an embodiment, said hybrid access controller is configured for interacting with at least one of: authentication, authorization, accounting, policy control, charging and other surrounding functions in the subscription plane.

In an embodiment, said hybrid access controller is communicatively coupled to the Mobility Management Entity (MME) of an Evolved Packet Core (EPC), and is configured for appearing as an eNodeB or Small Cells Gateway to said MME.

In an embodiment, said hybrid access controller is communicatively coupled to the PDN Gateway (PGW) of an Evolved Packet Core (EPC), and is configured for appearing as a Trusted WLAN Access Network (TWAN) or evolved Broadband Network Gateway (eBNG) to said PGW.

In an embodiment, said hybrid access controller is configured for announcing a route to the MAC (Media Access Layer) or vMAC addresses of user equipment (UE) to a Virtualized Services Controller (VSC—i.e., an OpenFlow Controller) communicatively coupled to said hybrid access controller.

In an embodiment, said hybrid access controller is communicatively coupled to at least one Evolved Node B (eNB), in order to page a user equipment intended to receive downlink traffic incoming at said hybrid access gateway.

In an embodiment, said hybrid access controller is configured for receiving notification from said hybrid access gateway having detected OSI (Open Systems Interconnection) layer 2 traffic originating from an unknown MAC (Media Access Layer) address via a cellular access network (cMAC) or non-cellular access network (ncMAC) of said communication network; for analyzing said notification in order to determine the presence of a user equipment in said respective access network; and for associating a virtual MAC address (vMAC) with said user equipment. In an exemplary embodiment, said hybrid access controller is configured for performing said associating by updating a table configured for storing associations between a number of user equipments and a respective number of OSI layer 2 addresses, preferably MAC addresses.

This embodiment will be appreciated to represent a 'Data-Triggered Handover' between multiple hybrid access gateways.

In an embodiment, said hybrid access controller is configured for exchanging Non-Access Stratum signaling with the user equipment (UE).

According to another aspect of the invention, there is provided a communication network system for hybrid access control and native bridged communication, comprising a hybrid access controller (HAC) according to any of the embodiments as described above and a hybrid access gateway (HAG) according to any of the embodiments as described above, communicatively coupled to each other.

The skilled person will understand that the hereinabove described considerations and advantages also apply for embodiments of the system, mutatis mutandis.

In an embodiment, said hybrid access controller and said hybrid access gateway are coupled to each other over a reference point (F7) available for standardization by 3GPP. The skilled person will understand that the HAC-HAG communication can be over any suitable protocol. Non-limiting examples may include SDN OpenFlow, or even UNIX Inter-Process Communication.

According to another aspect of the invention, there is provided a method for native bridged communication in a communication network, comprising, preferably at a hybrid access gateway apparatus:
receiving downlink Open Systems Interconnection (OSI) layer 2 traffic in said communication network;
communicatively coupling to a user equipment (UE) represented by an OSI layer 2 address via a cellular network of said communication network;
inspecting an OSI layer 2 header of said received traffic; and
based on said inspected OSI layer 2 header, directing said received traffic to said user equipment via said at least one downstream cellular coupling interface.

The skilled person will understand that the hereinabove described considerations and advantages also apply for embodiments of the method, mutatis mutandis.

In a preferred embodiment, the method comprises storing associations between a number of user equipments including said user equipment and a number of OSI layer 2 addresses respectively representing said number of user equipments.

In another preferred embodiment, said coupling comprises coupling to said user equipment via a cellular access network comprising a shared or common channel or radio access bearer (RAB) supporting concurrent, preferably contention-based, access by multiple user equipments.

In an embodiment, said inspecting comprises performing 4-tuple Shallow Frame Inspection on a source MAC (Media Access Layer) address, a destination MAC address, a protocol indication, and a bridged subnetwork identification; wherein said bridged subnetwork identification is an identification of a bridged subnetwork of said communication network; wherein said bridged subnetwork is a virtual network configured to allow inter-UE communication at OSI layer 2 in bridged (a.k.a. switched) mode by UE which are attached to the same bridged subnetwork, and to disallow inter-UE communication at OSI layer 2 in bridged mode by UE which are attached to a different bridged subnetwork.

In a particular embodiment, said method comprises allowing Broadcast. Unknown unicast, and Multicast (BUM) traffic on at least one bridged subnetwork of said communication network.

In an embodiment, said inspecting comprises inspecting an OSI layer 2 payload of said received traffic. By analogy to Deep Packet Inspection, this operation of inspecting the received traffic beyond the OSI layer 2 header may be denoted as Deep Frame Inspection (DFI).

In an embodiment, the user equipment (UE) connected to said cellular access network is identified by an OSI layer 2 address (denoted as cellular MAC address: cMAC) which is derived by said method from a temporary identifier for said UE, such as the Globally Unique Temporary Identifier (GUTI), and which preferably comprises the least significant bytes of said temporary identifier/GUTI, for example up to and including its MMEC (Mobile Management Entity Code). In a further developed exemplary embodiment, the same UE may in addition also be connected to a non-cellular access network of said communication network where it is identified by another OSI layer 2 address (denoted as non-cellular MAC address: ncMAC), such as a built-in WLAN NIC (Network Interface Controller) MAC address.

In a yet further developed embodiment, said method comprises associating a virtual MAC address (vMAC) representing said user equipment (UE) with said cMAC address or with said cMAC address and said ncMAC address of said user equipment (UE) in a or said table, based on higher-level authorization (e.g. from an Authentication, Authorization and Accounting server) in said communication network of said user equipment (UE).

In an embodiment, said directing comprises directing said received traffic to the cMAC address and optionally also to the ncMAC address according to a distribution algorithm which is configured to prevent out-of-sequence delivery of said received traffic at said user equipment (UE).

In a specific embodiment, said directing to the cMAC address and optionally also to the ncMAC address is based on said associating.

In an embodiment, said method comprises detecting from upstream traffic from said UE that the UE has been admitted to said cellular access network, and reconfiguring said direction module to direct downstream traffic to said UE. Optionally, in that embodiment, said method comprises notifying a higher-level server in said communication network (e.g. a hybrid access controller as will be described below) of said detecting.

In an embodiment, said method comprises detecting from upstream traffic from said UE that said UE has been admitted to a non-cellular access network, and reconfiguring to direct downstream traffic to said UE. Optionally, in that embodiment, said method comprises notifying a higher-level server in said communication network (e.g. a hybrid access controller as will be described below) of said detecting.

In an embodiment, said method comprises detecting from upstream traffic that said UE has moved to a different part of said cellular access network or to a different part of said non-cellular network and reconfiguring said direction module to direct downstream traffic to the UE. Optionally, in that embodiment, said method comprises notifying a higher-level server in said communication network (e.g. a hybrid access controller as will be described below) of said detecting.

In an embodiment, said method comprises detecting from upstream traffic that an attacking user equipment is attempting to impersonate another UE by spoofing its layer 2 address or its layer 3 address.

In an embodiment, said method comprises directing said received traffic to said user equipment (UE) via a cellular access network and a non-cellular access network of said communication network concurrently.

In another embodiment, said method comprises directing part of said received traffic to the user equipment via a cellular access network on which dedicated logical channels or radio access bearers (RAB) are established, and part of said received traffic via a or said shared or common channel or RAB supporting concurrent, preferably contention-based, access by multiple UE. In a further developed embodiment, said method comprises directing said parts of said received traffic based on one or more types of said received traffic.

In an embodiment, said method comprises storing at least one pairwise master key (PMK) associated with a user equipment (UE) connected to said communication network; and encrypting and decrypting traffic to and from said user equipment using said stored at least one pairwise master key. In an example embodiment, the at least one PMK is derived according to the Institute of Electrical and Electronics Engineers (IEEE) 802.11i standard. In a further developed embodiment, the at least one PMK is derived by an Authentication, Authorization and Accounting (AAA) server of said communication network. In another example embodiment, the at least one PMK results from the authentication procedure of a cellular user equipment (UE) according to $3^{rd}$ Generation Partnership Project (3GPP) standards.

In an embodiment, said method comprises using the Institute of Electrical and Electronics Engineers (IEEE) 802.1AE (a.k.a. MACsec) protocol for said encrypting and said decrypting. In another embodiment, said method comprises using the Wi-Fi Alliance Wi-Fi Protected Access II (a.k.a. WPA2) protocol for said encrypting and decrypting. In another embodiment, said cryptographic module is configured for using a protocol standardized by the $3^{rd}$ Generation Partnership Project (3GPP).

In an embodiment, said method comprises:
   encapsulating uplink OSI layer 3 traffic outbound towards an Evolved Packet Core (EPC); and
   decapsulating downlink GTP-U traffic inbound from said EPC and forwarding said decapsulated downlink GTP-U traffic to said hybrid access gateway.

According to another aspect of the invention, there is provided a method for hybrid access control in a communication network, comprising, preferably at a hybrid access controller according to any one of the embodiments thereof described above:

being communicatively coupled to and controlling a hybrid access gateway according to any of the embodiments as described above;

by setting up and controlling:

an upstream interface of said hybrid access gateway, which is configured for receiving downlink Open Systems Interconnection (OSI) layer 2 traffic in said communication network;

at least one downstream cellular coupling interface of said hybrid access gateway, which is configured to be communicatively coupled to a user equipment (UE) represented by an OSI layer 2 address via a cellular access network (e.g. a Radio Access Network or RAN) of said communication network;

an inspection module of said hybrid access gateway, which is configured for inspecting an OSI layer 2 header of said received traffic; and a direction module of said hybrid access gateway, which is configured for, based on said inspected OSI layer 2 header, directing said received traffic to said user equipment via said at least one downstream cellular coupling interface.

The skilled person will understand that the hereinabove described considerations and advantages also apply for embodiments of this method, muratis mutandis.

In a preferred embodiment, the method comprises performing the tasks of a 3GPP ($3^{rd}$ Generation Partnership Project) Mobility Management Entity.

In another preferred embodiment, the method comprises performing the tasks of a 3GPP Serving Gateway; In a particular embodiment, the method comprises performing the tasks of a 3GPP TWAG within a 3GPP TWAN; and performing the tasks of a 3GPP TWAP within a 3GPP TWAN.

In another embodiment, the method comprises performing the tasks of a 3GPP Broadband Network Gateway.

In another embodiment, the method comprises performing the tasks of a Small Cells Gateway.

In a further developed embodiment, said coupling occurs via a reference point (F7) available for standardization by the $3^{rd}$ Generation Partnership Project (3GPP), Open Networking Forum (ONF) or Next Generation Mobile Alliance (NGMA).

In an embodiment, said method comprises interacting with at least one of: authentication, authorization, accounting, policy control, charging and other northbound functions in the subscription plane.

In an embodiment, said method comprises communicatively coupling said hybrid access controller to the Mobility Management Entity (MME) of an Evolved Packet Core (EPC), and is configured for appearing as an eNodeB or Small Cells Gateway to said MME.

In an embodiment, said method comprises communicatively coupling said hybrid access controller to the PDN Gateway (PGW) of an Evolved Packet Core (EPC), and is configured for appearing as a Trusted WLAN Access Network (TWAN) or evolved Broadband Network Gateway (eBNG) to said PGW.

In an embodiment, said method comprises announcing a route to the MAC (Media Access Layer) or vMAC addresses of user equipment (UE) to a Virtualized Services Controller (VSC—i.e. an OpenFlow Controller) communicatively coupled to said hybrid access controller.

In an embodiment, said method comprises communicatively coupling said hybrid access controller to at least one Evolved Node B (eNB), in order to page a user equipment intended to receive downlink traffic incoming at said hybrid access gateway.

In an embodiment, said method comprises receiving notification from said hybrid access gateway having detected OSI (Open Systems Interconnection) layer 2 traffic originating from an unknown MAC (Media Access Layer) address via a cellular access network (cMAC) or non-cellular access network (ncMAC) of said communication network; analyzing said notification in order to determine the presence of a user equipment in said respective access network; and associating a virtual MAC address (vMAC) with said user equipment. In an exemplary embodiment, said associating comprises updating a table configured for storing associations between a number of user equipments and a respective number of OSI layer 2 addresses, preferably MAC addresses.

In an embodiment, said method comprises exchanging Non-Access Stratum signaling with the user equipment (UE).

According to another aspect of the invention, there is provided a computer program product comprising computer-executable instructions for performing a method when the program is run on a computer, the method comprising any one or more of the steps of any one of the embodiments of the methods described hereinabove.

The skilled person will understand that the hereinabove described considerations and advantages also apply for embodiments of the computer program product, mutatis mutandis.

According to a further aspect of the invention, there is provided a computer device or other hardware device programmed to perform any one or more steps of any one of the embodiments of the methods disclosed above. According to another aspect there is provided a data storage device encoding a program in machine-readable and machine-executable form to perform one or more steps of any one of the embodiments of the methods disclosed above.

BRIEF DESCRIPTION OF THE FIGURES

The accompanying drawings are used to illustrate presently preferred non-limiting exemplary embodiments according to the present invention. The above and other advantages of the features of embodiments according to the invention and objects of the invention will become more apparent and the invention will be better understood from the following detailed description when read in conjunction with the accompanying drawings, in which.

DESCRIPTION OF EMBODIMENTS

Figure 1:
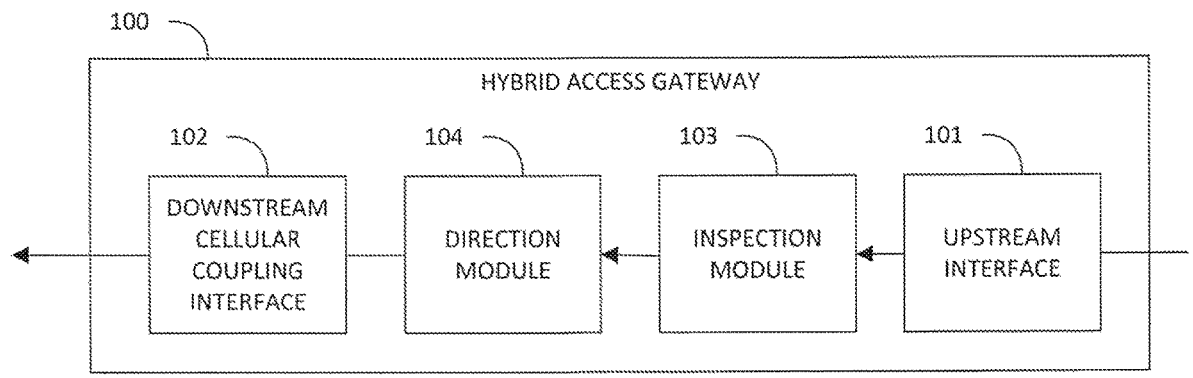
FIG. 1 illustrates schematically an embodiment of a hybrid access gateway (HAG) 100 according to the present invention.

FIG. 1 illustrates schematically an embodiment of a hybrid access gateway (HAG) 100 according to the present invention. The HAG 100 is suitable for native bridged communication in a communication network, and comprises an upstream interface 101, at least one (only one is shown) downstream cellular coupling interface 102, an inspection module 103, and a direction module 104.

The upstream interface 101 is configured for receiving downlink Open Systems Interconnection (OSI) layer 2 traffic in said communication network. The (or each) downstream cellular coupling interface 102 is configured to be communicatively coupled to a user equipment (UE) represented by an OSI layer 2 address via a cellular access network (e.g. a Radio Access Network or RAN) of said communication network. The inspection module 103 is configured for inspecting an OSI layer 2 header of said received traffic. The direction module 104 is configured for, based on said inspected OSI layer 2 header, directing said received traffic to said user equipment via said at least one downstream cellular coupling interface 101.

Figure 2:
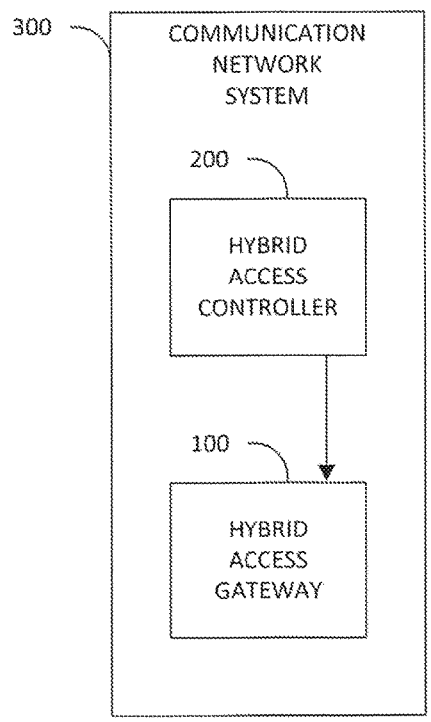
FIG. 2 illustrates schematically an embodiment of a communication network system 300 according to the present invention, comprising a hybrid access controller (HAC) 200 and a hybrid access gateway (HAG) 100 according to the present invention.

FIG. 2 illustrates schematically an embodiment of a communication network system 300 according to the present invention, comprising a hybrid access controller (HAC) 200 and a hybrid access gateway (HAG) 100 according to the present invention. The HAC 200 is suitable for hybrid access control in a communication network. The HAC 200 is configured for being communicatively coupled to and for controlling the HAG 100. The HAC 200 does this by setting up and controlling:

an upstream interface 101 of said hybrid access gateway 100, which is configured for receiving downlink Open Systems Interconnection (OSI) layer 2 traffic in said communication network;

at least one downstream cellular coupling interface 102 of said hybrid access gateway 100, which is configured to be communicatively coupled to a user equipment (UE) represented by an OSI layer 2 address via a cellular access network (e.g. a Radio Access Network or RAN) of said communication network;

an inspection module 103 of said hybrid access gateway 100, which is configured for inspecting an OSI layer 2 header of said received traffic; and a direction module 104 of said hybrid access gateway 100, which is configured for, based on said inspected OSI layer 2 header, directing said received traffic to said user equipment via said at least one downstream cellular coupling interface 102.

Figure 3:
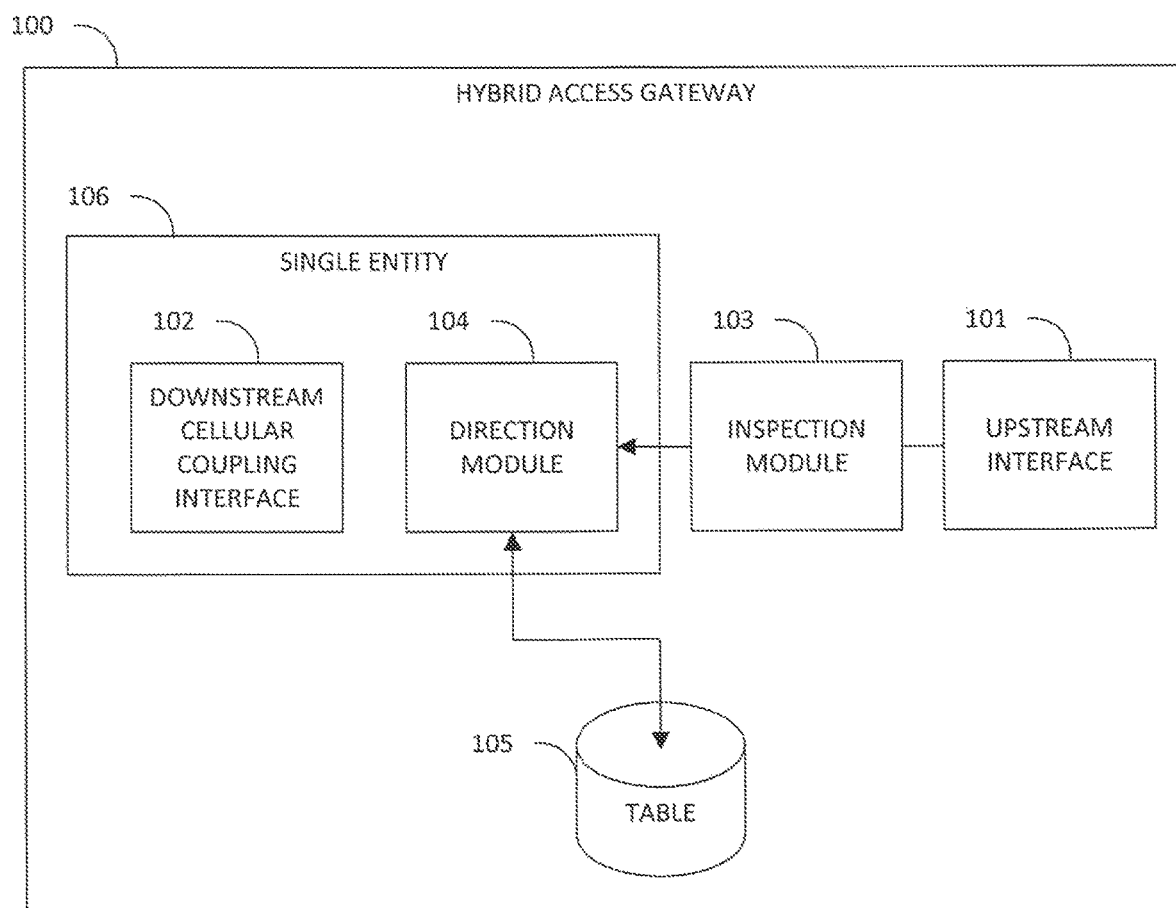
FIG. 3 illustrates schematically another embodiment of a hybrid access gateway (HAG) 100 according to the present invention.

FIG. 3 illustrates schematically another embodiment of a hybrid access gateway (HAG) 100 according to the present invention. The HAG 100 comprises a table 105 configured for storing associations between a number of user equipments including said user equipment and a number of OSI layer 2 addresses respectively representing said number of user equipments. Further, the presently shown HAG 100 has been adapted within the present invention such that the direction module 104 and the at least one downstream cellular coupling interface 102 are combined as a single entity 106, which could for example be implemented as a virtual routing element.

Figure 4:
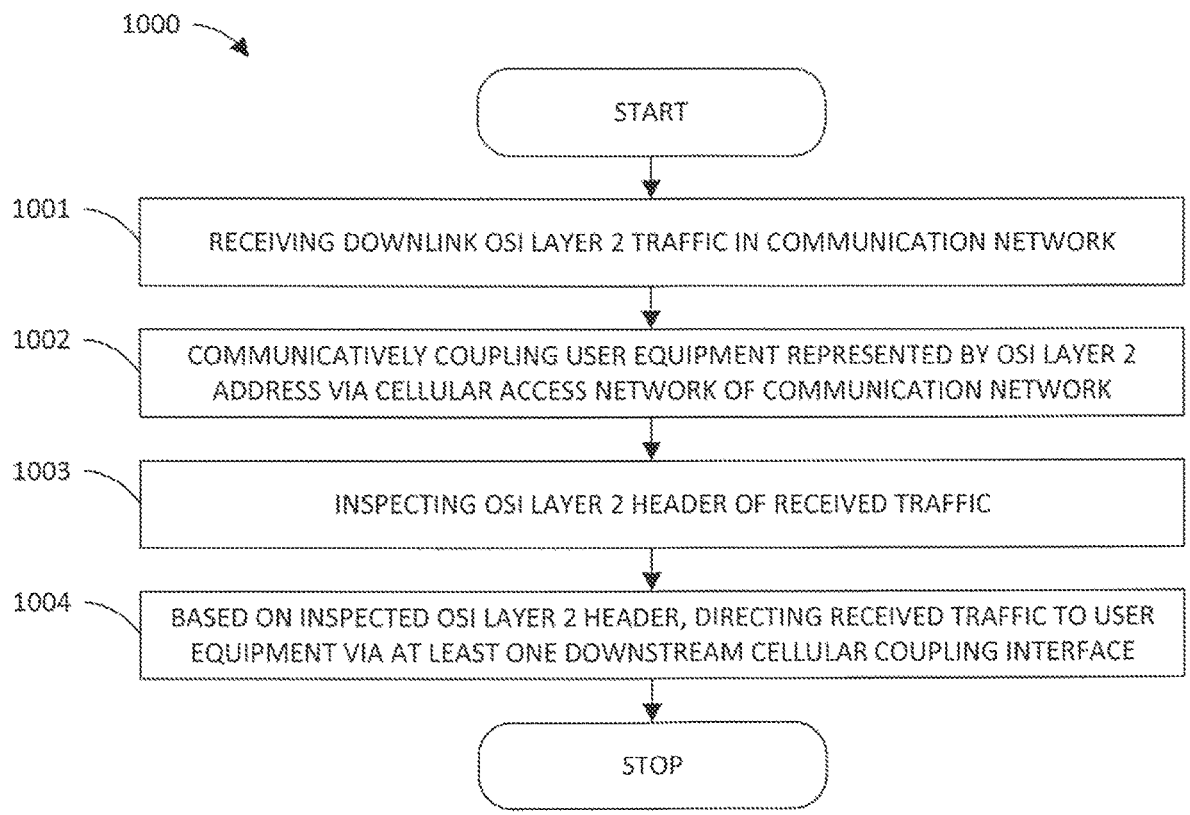
FIG. 4 illustrates schematically an embodiment of a method 1000 according to the present invention.

FIG. 4 illustrates schematically an embodiment of a method 1000 according to the present invention. The method 1000 comprises the following steps, preferably at a HAG 100 as described above:

receiving 1001 downlink Open Systems Interconnection (OSI) layer 2 traffic in said communication network;

communicatively coupling 1002 a user equipment (UE) represented by an OSI layer 2 address via a cellular access network of said communication network;

inspecting 1003 an OSI layer 2 header of said received traffic; and based on said inspected OSI layer 2 header, directing 1004 said received traffic to said user equipment via said at least one downstream cellular coupling interface.

Figure 5:
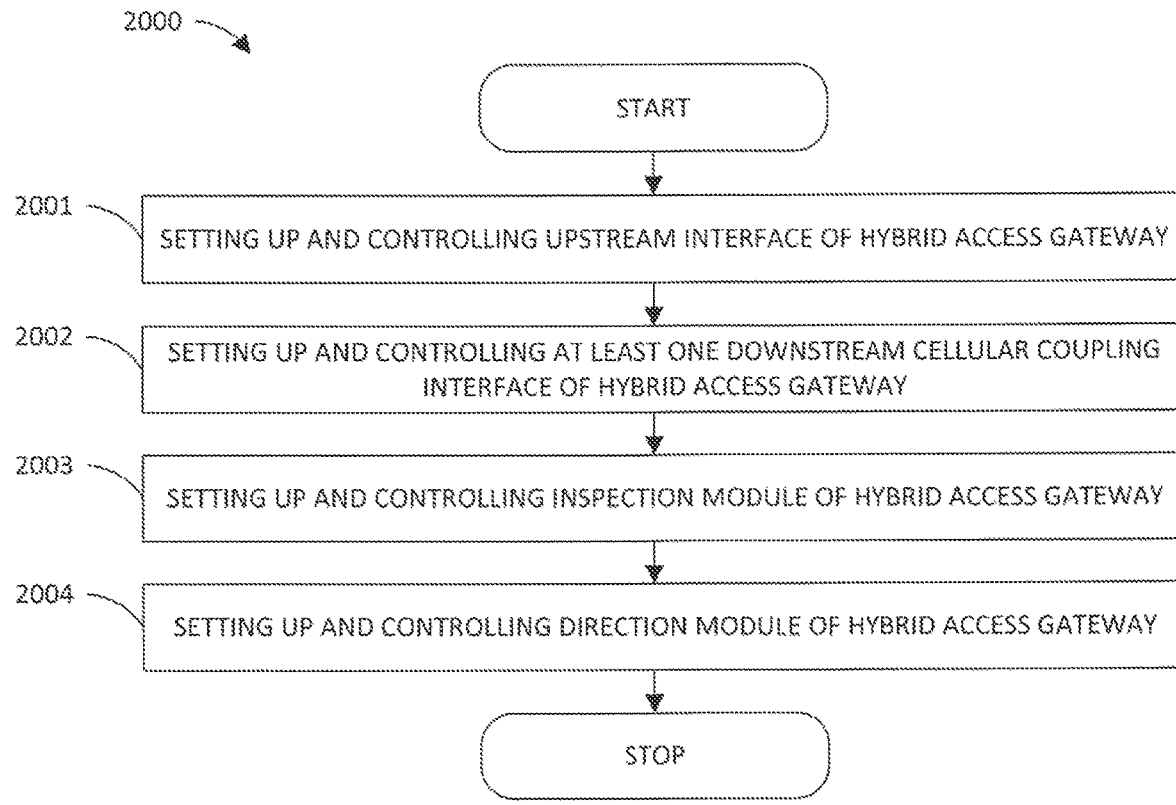
FIG. 5 illustrates schematically an embodiment of another method 2000 according to the present invention.

FIG. 5 illustrates schematically an embodiment of another method 2000 according to the present invention. The method 2000 comprises the following steps, preferably at a HAC 200 as described above:

setting up and controlling 2001 an upstream interface 101 of said hybrid access gateway 100, which is configured for receiving downlink Open Systems Interconnection (OSI) layer 2 traffic in said communication network;

setting up and controlling 2002 at least one downstream cellular coupling interface 102 of said hybrid access gateway 100, which is configured to be communicatively coupled to a user equipment (UE) represented by an OSI layer 2 address via a cellular access network (e.g. a Radio Access Network or RAN) of said communication network;

setting up and controlling 2003 an inspection module 103 of said hybrid access gateway 100, which is configured for inspecting an OSI layer 2 header of said received traffic; and setting up and controlling 2004 a direction module 104 of said hybrid access gateway 100, which is configured for, based on said inspected OSI layer 2 header, directing said received traffic to said user equipment via said at least one downstream cellular coupling interface.

In an embodiment of the system 300 according to the present invention, the user equipment (UE) connected to said cellular access network is identified by an OSI layer 2 address (denoted as cellular MAC address: cMAC) which is derived from a temporary identifier for said UE, such as the Globally Unique Temporary Identifier (GUTI), and which preferably comprises the least significant bytes of said temporary identifier/GUTI, for example up to and including its MMEC (Mobile Management Entity Code). In a further developed exemplary embodiment, the same UE may in addition also be connected to a non-cellular access network of said communication network where it is identified by another OSI layer 2 address (denoted as non-cellular MAC address: ncMAC), such as a built-in WLAN NIC (Network Interface Controller) MAC address. The 5G UE MAC address may be derived from the Globally Unique Temporary Identity (GUTI)—namely from the S-TMSI. The same technique can be applied in evolved 4G RAN (evolved E-UTRAN), according to future standards.

In an embodiment of the HAG 100, said direction module 103 comprises a multiplexer (MUX) configured for directing said received traffic to said user equipment (UE) via a cellular access network and a non-cellular access network of said communication network concurrently. The MUX may hash downstream frame headers and optionally also IP headers in order to spread the downstream traffic over cellular RAN and non-cellular RAN (WLAN), without incurring out-of-sequence arrival of the Ethernet frames and IP packets therein.

Figure 6:
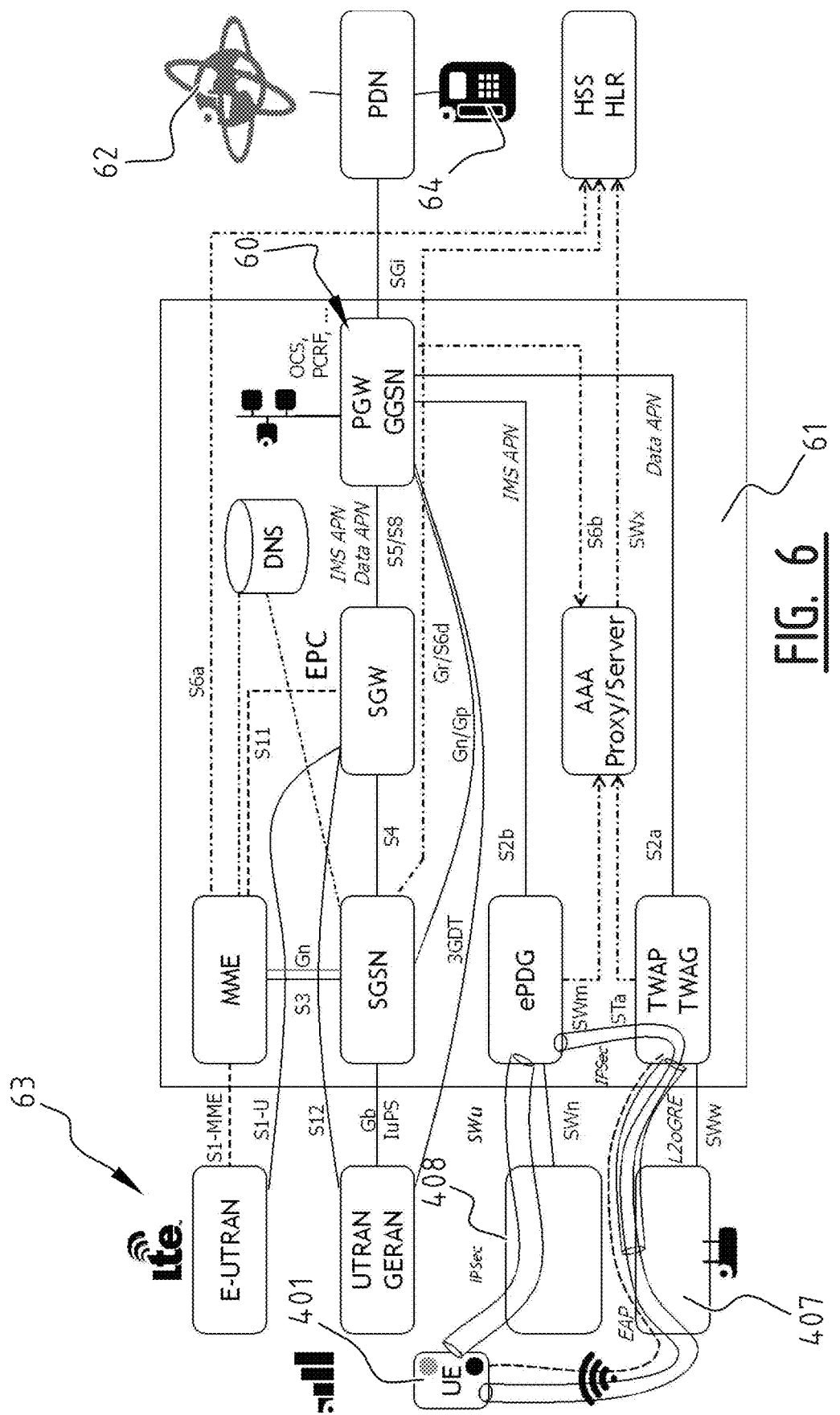
FIG. 6 illustrates schematically the known Third Generation Partnership Project (3GPP) Evolved Packet Core (EPC) architecture.

FIG. 6 illustrates schematically the known Third Generation Partnership Project (3GPP) Evolved Packet Core (EPC) architecture, in particular for access for user equipment UE 401 from four access networks 63 to the communication network, namely legacy UTRAN/GERAN, E-UTRAN, Untrusted Wi-Fi 408, and Trusted Wi-Fi 407, to the Internet 62 and/or to voice network 64.

For a potential handover from the Untrusted Wi-Fi access network 408 to the Trusted Wi-Fi access network 407, it is required to anchor the IP (Internet Protocol) address at the PGW (Packet Data Network Gateway) 60 in the IP Mobile Core 61 to ensure inter-RAT continuity and hybrid (thus cellular as well as non-cellular) access. This requires tedious communication.

Known techniques may be used for setting up a tunnel from the UE over the EPC to a Gateway on the SGi side of the PDN Gateway, thereby encapsulating L2 Frames in IP packets.

The problematic issue is not resolved: an EPS Session/PDN Connection must still be established, and the nearest point at which bridged or routed communication is possible with other wireless users (cellular/non-cellular) or with external FDN/PDN is even further away from the UE, namely at the TWAG (Trusted WLAN/Wireless Access Gateway).

Furthermore the encapsulation needs to start at the cellular UE, which results in more power consumption and more issues than if the encapsulation was started at the Evolved Node B (ENB) (4G/5G).

The encapsulation protocol blinds the PGW: the PGW can no longer analyze the IP packets to/from the cellular (e.g. LTE) UE at layer 3, 4 or 7. The PGW now perceives all traffic as GRE (Generic Routing Encapsulation) traffic in the example above. Shallow, heuristic and deep packet inspection are however essential capabilities in modern LTE networks, where differentiated QoS Classes are required by services such as SIP signaling, conversational audio or video, with guaranteed or non-guaranteed bit rates, different Allocation and Retention Priorities (ARP), preemption etc.

These and other shortcomings may be addressed with certain embodiments of the HAG 100 according to the present invention, for example as described above.

In an embodiment of the HAG 100 according to the present invention, said inspection module 102 is configured for inspecting said OSI layer 2 header by performing 4-tuple Shallow Frame Inspection on a source MAC (Media Access Layer) address, a destination MAC address, a protocol indication, and a bridged subnetwork identification; wherein said bridged subnetwork identification is an identification of a bridged subnetwork of said communication network; wherein said bridged subnetwork is a virtual network configured to allow inter-UE communication at OSI layer 2 in bridged (a.k.a. switched) mode by UE which are attached to the same bridged subnetwork, and to disallow inter-UE communication at OSI layer 2 in bridged mode by UE which are attached to a different bridged subnetwork.

In a particular embodiment, said hybrid access gateway 100 is configured for allowing Broadcast, Unknown unicast, and Multicast (BUM) traffic on at least one bridged subnetwork of said communication network.

Thus, certain embodiments according to the present invention are capable of establishing a high number of bridged subnetworks (L2 switched), and which can connect the cellular UE or non-cellular UE to the correct bridged subnetwork, following proper authentication and authorization. Within each bridged subnetwork Broadcast, Unknown unicast and Multicast (BUM) traffic may be permitted, such that the admitted UEs may send and can receive BUM traffic without risking a full flood of the network.

In a yet further developed embodiment, said inspection module 102 is configured for associating a virtual MAC address (vMAC) representing said user equipment (UE) with said cMAC address or with said cMAC address and said ncMAC address of said user equipment (UE) in a or said table, based on higher-level authorization (e.g. from an Authentication, Authorization and Accounting server) in said communication network of said user equipment (UE), and said direction module is configured for directing said received traffic to the cMAC address and optionally also to the ncMAC address according to a distribution algorithm which is configured to prevent out-of-sequence delivery of said received traffic at said user equipment (UE).

Thus, in some embodiments according to the present invention, the UE can be reached concurrently through the simultaneous combination of a cellular RAN and a non-cellular RAN (e.g. WLAN) without requiring inspection of IP packets, IP protocols and ports (5-tuple hashing at PGW) but only of the L2 Ethernet frames at a Multiplexer. To this effect a Virtual MAC address is granted to the hybrid cellular+non-cellular UE.

Figure 7:
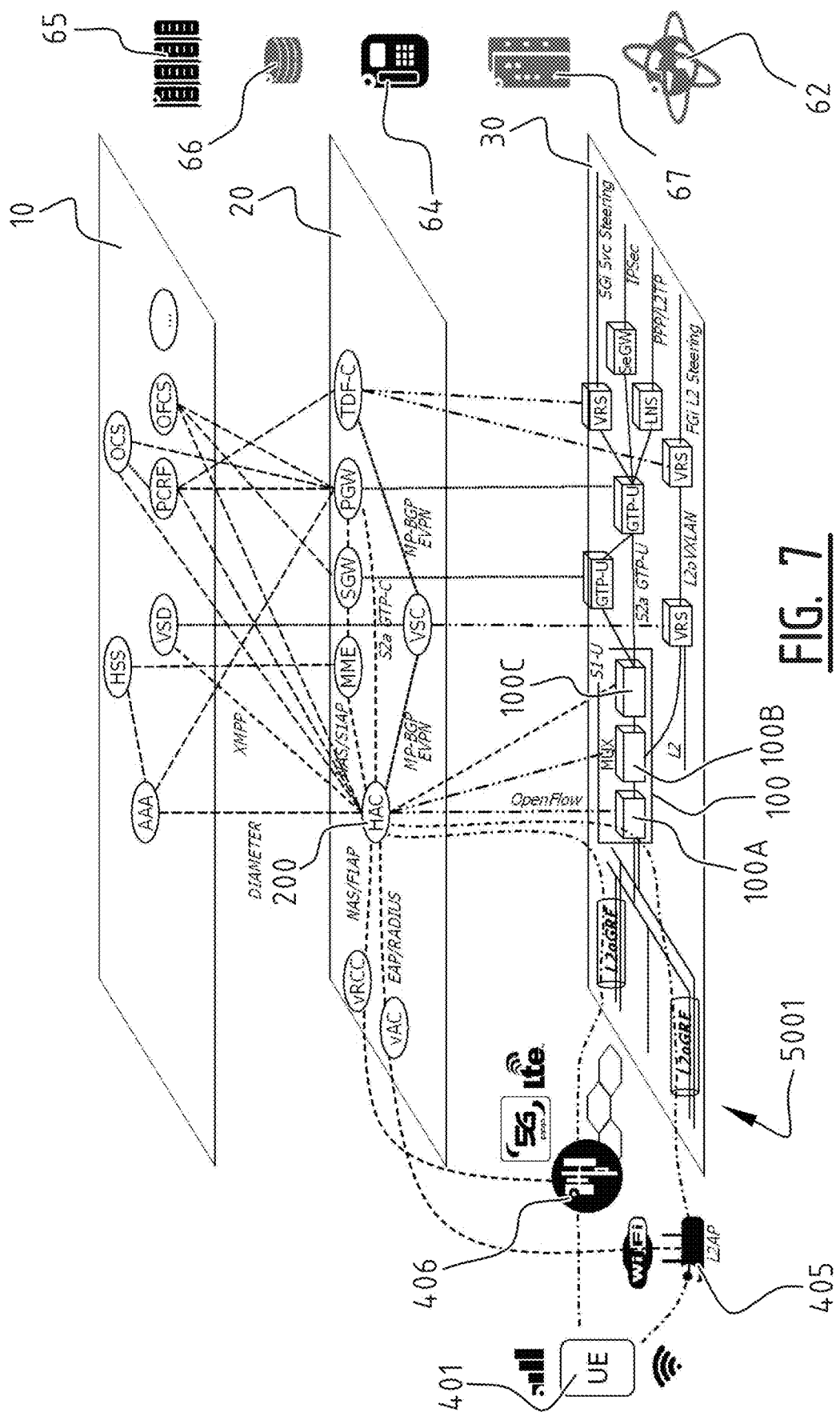
FIG. 7 illustrates schematically an embodiment of a communication network system according to the present invention.

FIG. 7 illustrates schematically an embodiment of a communication network system according to the present invention.

The embodiment presented in FIG. 7 comprises a Hybrid Access Gateway (HAG) 100, and a Hybrid Access Controller (HAC) 200 piloting a Virtual Router & Switch (VRS) 100A (which is a routing element and which may for example comprise the HAG's at least one downstream cellular coupling interface 102 and its direction module 104) and an optional multiplexer (MUX) 100B. The HAG's inspection module 103 and its upstream interface 101 are not explicitly shown in this and in other figures. The VRS 100A and MUX 100B are comprised by the HAG 100, which in the shown embodiment also comprises an optional GTP-U module 100C. The Subscription, AAA, Policy and Charging plane 10, the Mobility and Connectivity plane 20, and the User Data plane 30 are also shown. A user equipment UE 401 is shown connected (or attached) to a non-cellular access network 405 and to a cellular access network 406. Bridged subnetworks 5001 are also shown. On the core side of the network, the Internet 62 is shown as well as voice connection 64, datacenter connection 65 and enterprise connection 67.

Exemplary embodiments of the HAC may comprise six functional entities, which will be described hereafter:
1. Mobility Management Function (MMF) for 5G/4G RAN
2. Serving Gateway Function (SGF) for 5G RAN
3. Small Cells Gateway Function (SCGF) for 5G/4G Small Cells
4. Trusted WLAN Access Gateway (TWAG) controller
5. Trusted WLAN Authentication Proxy (TWAP)
6. Broadband Network Gateway (BNG)

The combination of functional entities 1 and 2 into a single entity together with functional entities 3-6 allows reducing the number of elements and interconnections in the communication network, thereby reducing complexity and improving latency.

Figure 8:
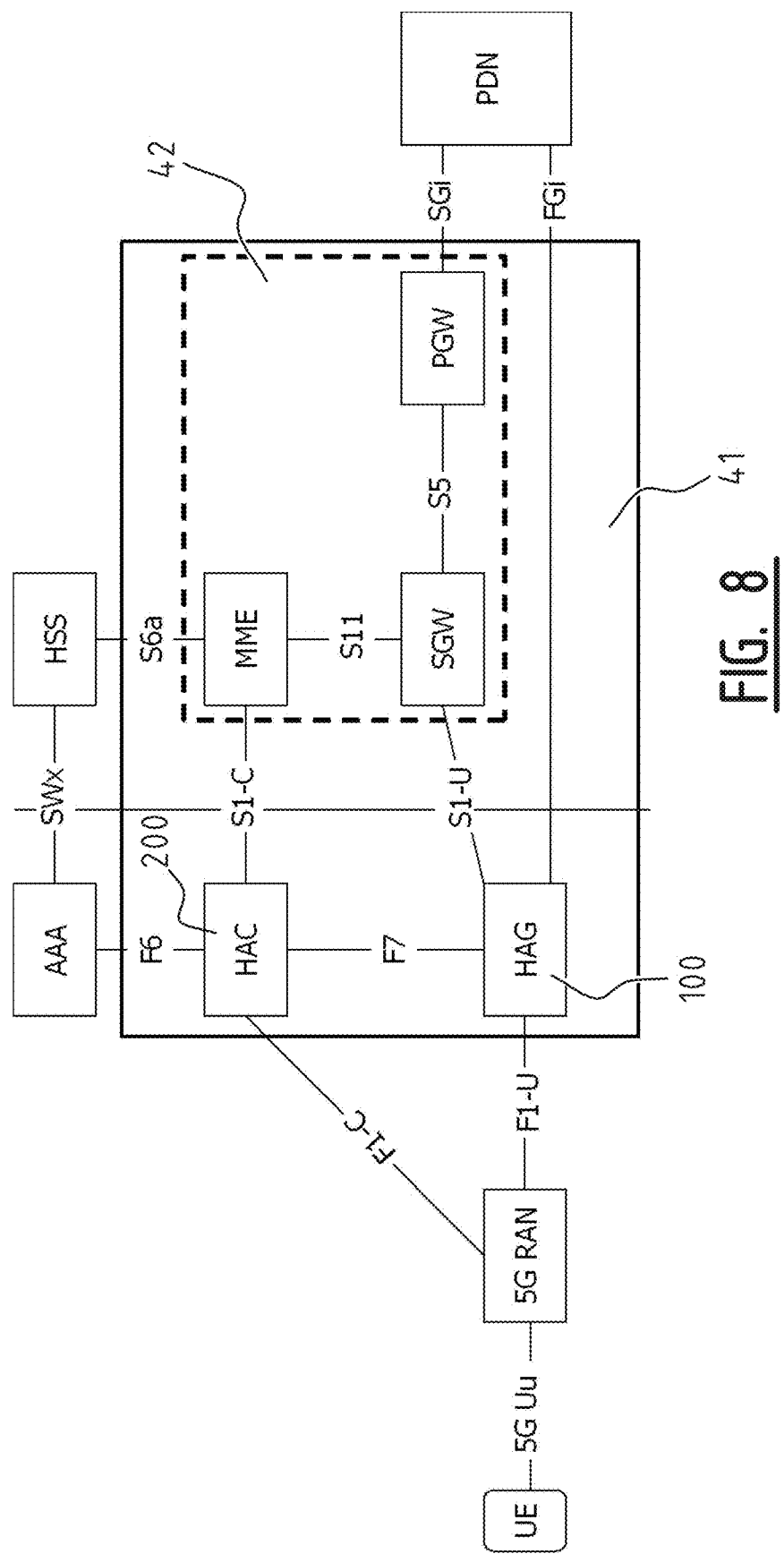
FIG. 8 illustrates schematically another embodiment of the system according to the present invention.

FIG. 8 illustrates schematically another embodiment of the system according to the present invention, in a Next Generation Mobile Core network 41, wherein a HAC 200 and a HAG 100 are shown connected to each other via a newly defined F7 interface (or reference point), to a 5G RAN via a newly defined F1 interface (or reference point), to a 3GPP EPC core network 42 via the well-known S1 interface, and (indirectly and directly) to a Packet Data Network, via a newly defined FGi reference point.

Figure 9:
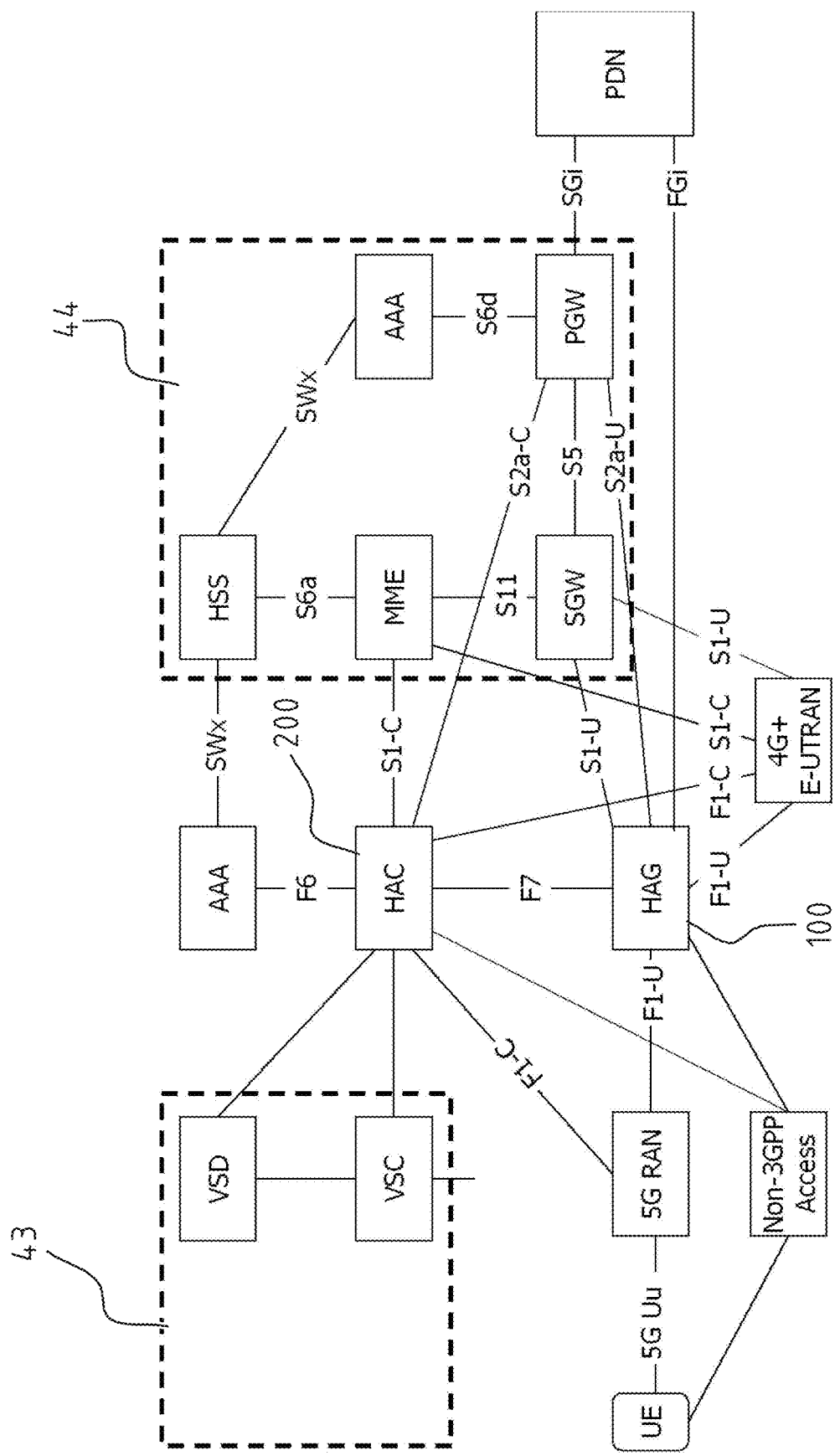
FIG. 9 illustrates schematically another embodiment of the system according to the present invention.

FIG. 9 illustrates schematically another embodiment of the system according to the present invention, wherein a HAC 600 and a HAG 100 are shown (as in FIG. 8) connected to a 5G RAN via a newly defined F1 interface, to an optional 3GPP EPC core network 44 via the well-known S1 interface, and (indirectly and directly) to a Packet Data Network or Switched Data Network, via a newly defined FGi reference point on which the user equipment is represented by a MAC address (cMAC for cellular MAC, ncMAC for non-cellular MAC and/or vMAC for virtual MAC). Further, the HAC 200 and HAG 100 are also connected to a non-3GPP access network (e.g. a WLAN) and to a 4G+E-UTRAN with augmented capabilities, via the newly defined F1 interface. Further, the HAC is shown connected to the following optional entities: a Virtual Services Platform (VSP) 43 comprising a Virtualized Services Directory (VSD) and a Virtualized Services Controller (VSC).

The HAC 200 communicates with the
1. Cellular UE via Non-Access Stratum (NAS) signaling, allowing UE attachment/authentication and possibly also authorization to access L2 bridged subnetworks.
2. Non-cellular UE (WLAN UE) via EAP (Extensible Authentication Protocol) over RADIUS (Remote Authentication Dial-In User Service), and possibly via other protocols such as IPSec IKE (Internet Key Exchange) with ISAKMP (Internet Security Association and Key Management Protocol) for access over untrusted WLAN networks.
3. Cellular or non-cellular UE via DHCP, SLAAC, RS/RA (Router Solicitation/Router Advertisement) and/or WLCP (Wireless LAN Control Plane protocol).
4. 4G/5G eNodeB or Radio Cluster Controller (RCC) via Five-G S1 Application Part (F1AP) on the new F1-C reference point.
5. WLAN Access Point (AP) or Access Controller (AC) via RADIUS.
6. Existing unmodified Evolved Packet Core (EPC) via the S1-MME interface (NAS/S1AP) to the MME and via the GTPv2-C S2a or S2b interface to the PGW.
7. Authentication, Authorization and Accounting (AAA) server via DIAMETER or RADIUS, with the purpose to authenticate/authorize UE but also to store stateful information pertaining to individual UE, allowing that information to be accessed by other instances of the SHC.
8. Home Subscriber Server (HSS) via DIAMETER.
9. Policy & Charging Rules Function (PCRF).
10. Online Charging System (OCS).
11. Offline Charging System (OFCS) and other northbound systems.
12. Non-Virtual or Virtual Router and Switch (VRS) 100A in the User Data plane via OpenFlow or other protocols (CLI/SSH or Command Line Interface/Secure Shell, SNMP or Simple Network Management Protocol, SOAP or Simple Object Access Protocol, Netconf/Yang, . . . ) in order to set up the bridged subnetworks and to admit individual UE to them.
13. L2 Multiplexer (MUX) 100B in the user plane via OpenFlow or other protocols to set up traffic distribution rules between cellular and non-cellular RAN, as well as interconnections to GTP-U encoders/decoders and to L2 Switched Data Networks.
14. Virtualized Services Platform (VSP) via MP-BGP (Multiprotocol Extensions for Border Gateway Protocol) and possibly XMPP (Extensible Messaging and Presence Protocol), thereby discovering the presence of MAC addresses, IP addresses or IP subnets on Ethernet VPN (EVPN), and programming rules accordingly in the User Data plane (VRS/MUX).
15. Other surrounding systems such as Lawful Interception Gateways (LIG).

The HAC 200 pilots the VRS 100A and MUX 100B in the User Data plane with the purpose to connect cellular UE and non-cellular UE to either:
an Untagged bridged subnetwork (with basic 802. Id Spanning Tree Protocol STP) via Standard OpenFlow commands
or a Tagged bridged subnetwork (16 million e.g. one per family, via enriched OpenFlow controlling
802.1aq Shortest Path Bridging (SPB) with 802.1ah MAC-in-MAC on the NNI between VRS
Or RFC6325 Rbridges (TRILL) with RFC7172 Fine Grained Labeling (FGL)

The VRS 100A permits BUM traffic within a single bridged subnetwork but not between different bridged subnetworks (to which different UE are admitted).

Furthermore the HAG 100 provides
Unencapsulated access: Ethernet or VLAN termination from WLAN AP and 5G RAN.
or Encapsulated access: L2oGRE termination from 5G RAN, whereby the GRE tunnel is originated by the 4G/5G eNodeB or RRC rather than by the cellular UE itself.
Forwarding of DHCP/WLCP traffic and possibly other control plane protocols to the HAC.
Data-Triggered Mobility detection: whenever traffic from a known UE MAC address pops out of a new GRE tunnel, following an unsuccessful ARP request for that MAC address in the old GRE tunnel, the local Forwarding table is automatically updated and optionally the HAC 200 is informed.

Data-Triggered Authentication: whenever traffic to/from an unknown UE MAC address is noticed, a query is sent to the HAC to retrieve UE information i.e. the bridged subnetwork onto which that MAC address shall be admitted.

Key Caching and the opportunistic distribution of pairwise master keys to neighboring APs or eNodeBs (802.11r).

UE liveliness checks such as Subscriber Host Connectivity Verification (SHCV) or more advanced interaction with the 5G eNodeB and HAC 200.

MAC spoof protection.

IP address spoof protection.

Cleansing of BUM traffic between different bridged subnetworks.

bridging to other VRS.

MAC-in-MAC encapsulation.

MAC-layer security (MACsec or similar) to the UE and to access nodes of the cellular (RAN) or non-cellular access network.

etc.

These features are only illustrative of the rich possible set of features in such unified (hybrid—i.e. over both cellular and non-cellular networks) User Data plane network element for cellular and non-cellular RAN, with access to external bridged networks, EVPN (i.e. Ethernet VPN) and GTP-U networks (EPC).

As an aside: a DHCPv4/v6 server or SLAAC can be deployed in a 5G or WLAN UE, alleviating responsibility for IP address assignment, pool management, LI, NAT, ALGs, IPv6 transition, etc. from the organization deploying the 5G network.

Figure 10:
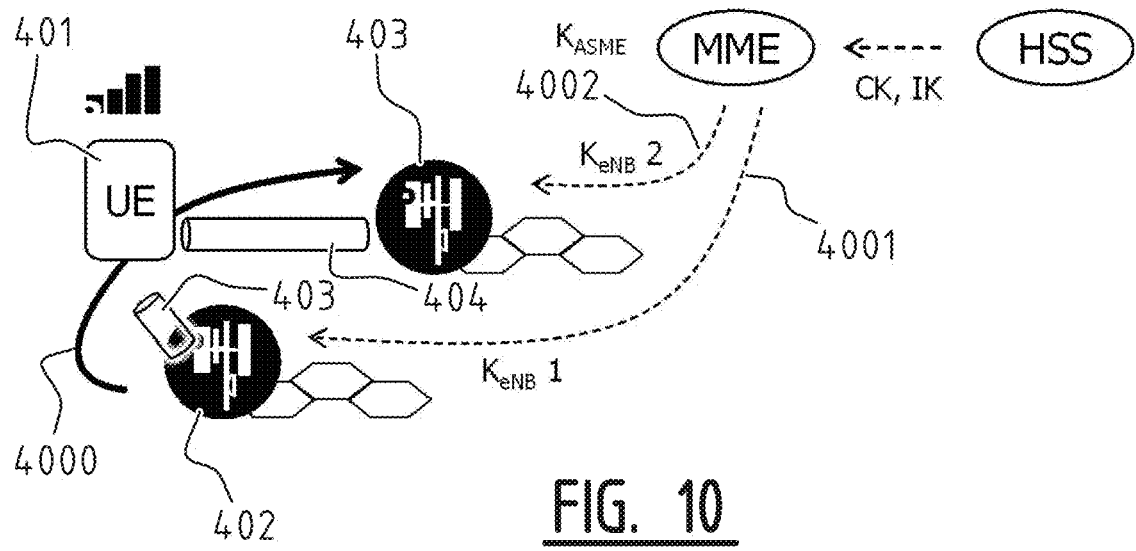
FIG. 10 illustrates schematically encryption setup for UE-handover between ENBs in a known 4G communication networks.

FIG. 10 illustrates schematically encryption setup for known 4G communication networks. The 4G MME installs $K_{eNB}$ 4001, 4002 at the eNB 402, 403 (a.k.a. eNodeB) as part of the time-consuming UE-Triggered Service Request procedure when a UE 401 moves 4000 from one to the other. Thus, separate keys 4001, 4002 must be generated, communicated and managed 403, 404.

Figure 11:
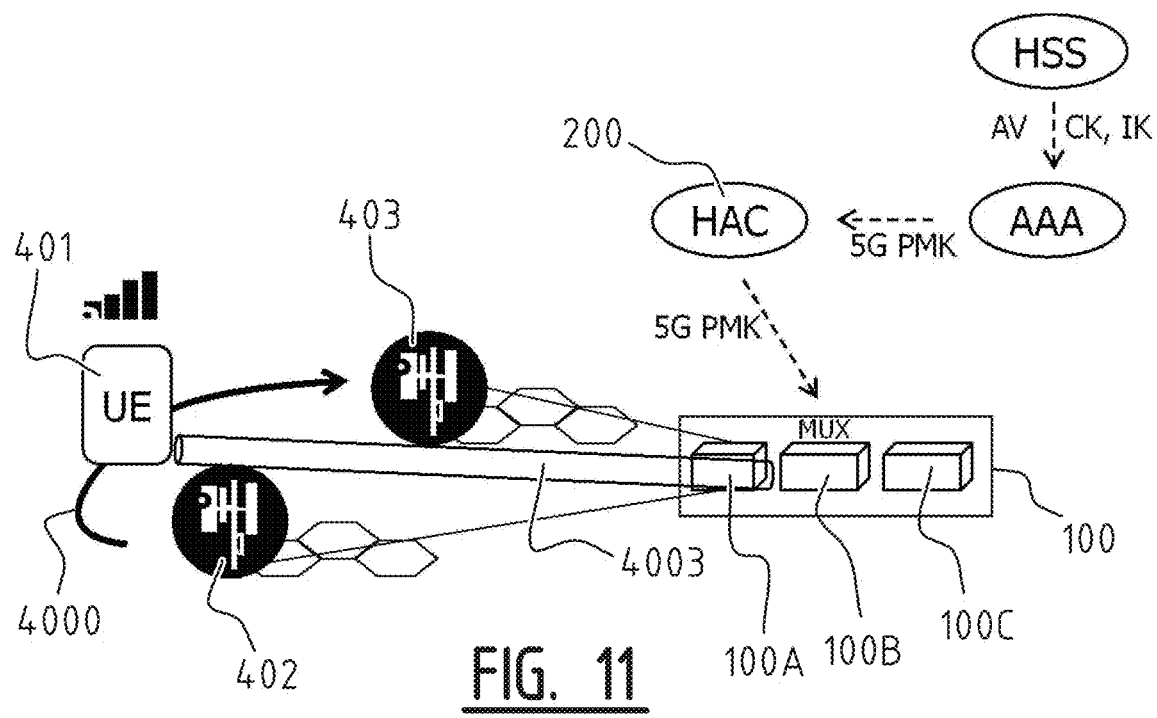
FIG. 11 illustrates schematically encryption setup for UE-handover between ENBs in a 5G communication networks with an embodiment of a hybrid access controller (HAC) according to the present invention.

FIG. 11 illustrates schematically encryption setup for 5G communication networks with an embodiment of a hybrid access controller (HAC) 200 according to the present invention.

In a way, the encryption point is moved from eNodeB (as shown in FIG. 10), back to the Core of the network. 5G HAC 200 would install Pairwise Master Keys at HAG 100, for example in the MUX block 100B or in the direction module 103 (not shown), for use both on 5G, 4G+ and Wi-Fi networks. This ensures a constant Security Association 4003 between UE and MUX 100B, for immediate use at the new eNodeB, both in case of contention-based (i.e. a form of concurrent) or dedicated-channel access.

Figure 12:
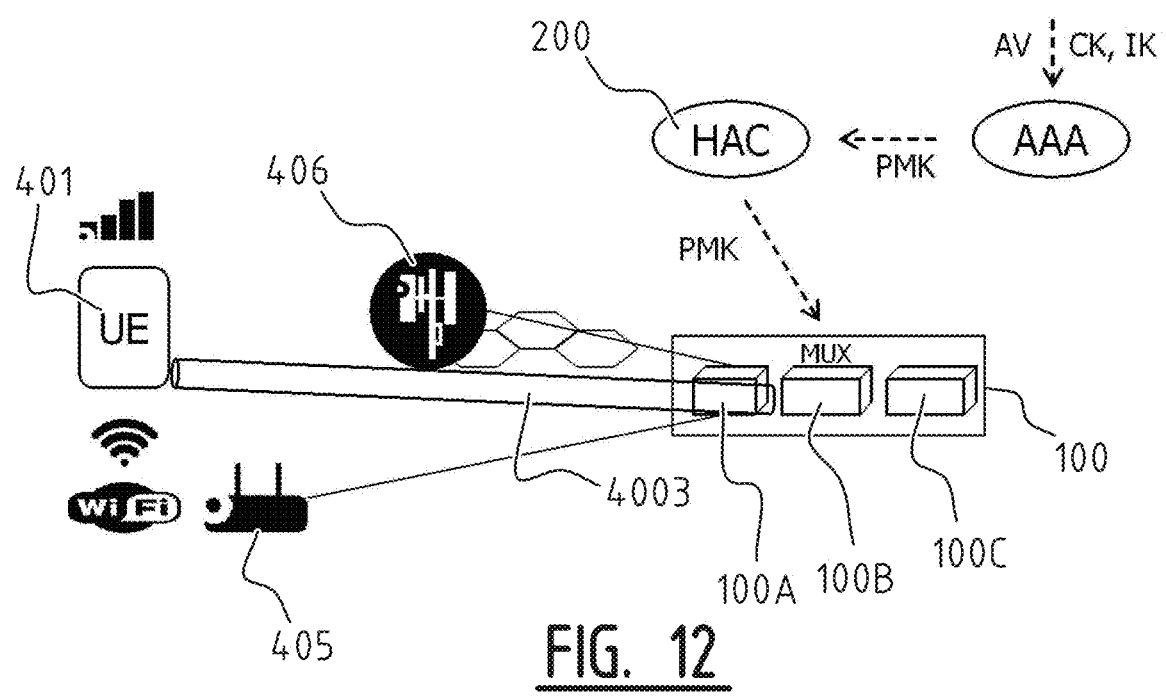
FIG. 12 illustrates schematically encryption setup for UE-handover across different radio access technologies in a 5G communication networks with an embodiment of a hybrid access controller (HAC) according to the present invention.

FIG. 12 illustrates schematically encryption setup for UE-handover across different radio access technologies 405, 406 in a 5G communication networks with an embodiment of a hybrid access controller (HAC) 200 according to the present invention.

The encryption is set up independently of the relevant Radio Access Technology for the network in which the UE is situated. Also, the same PMK could be used for cellular and non-cellular access. In particular, using 802.1x EAP PMK and the resulting 802.11i WPA2 encryption (TKIP or CCMP with AES) could be the main procedure in 5G, or this could become an option besides a new 5G 3GPP encryption.

Figure 13:
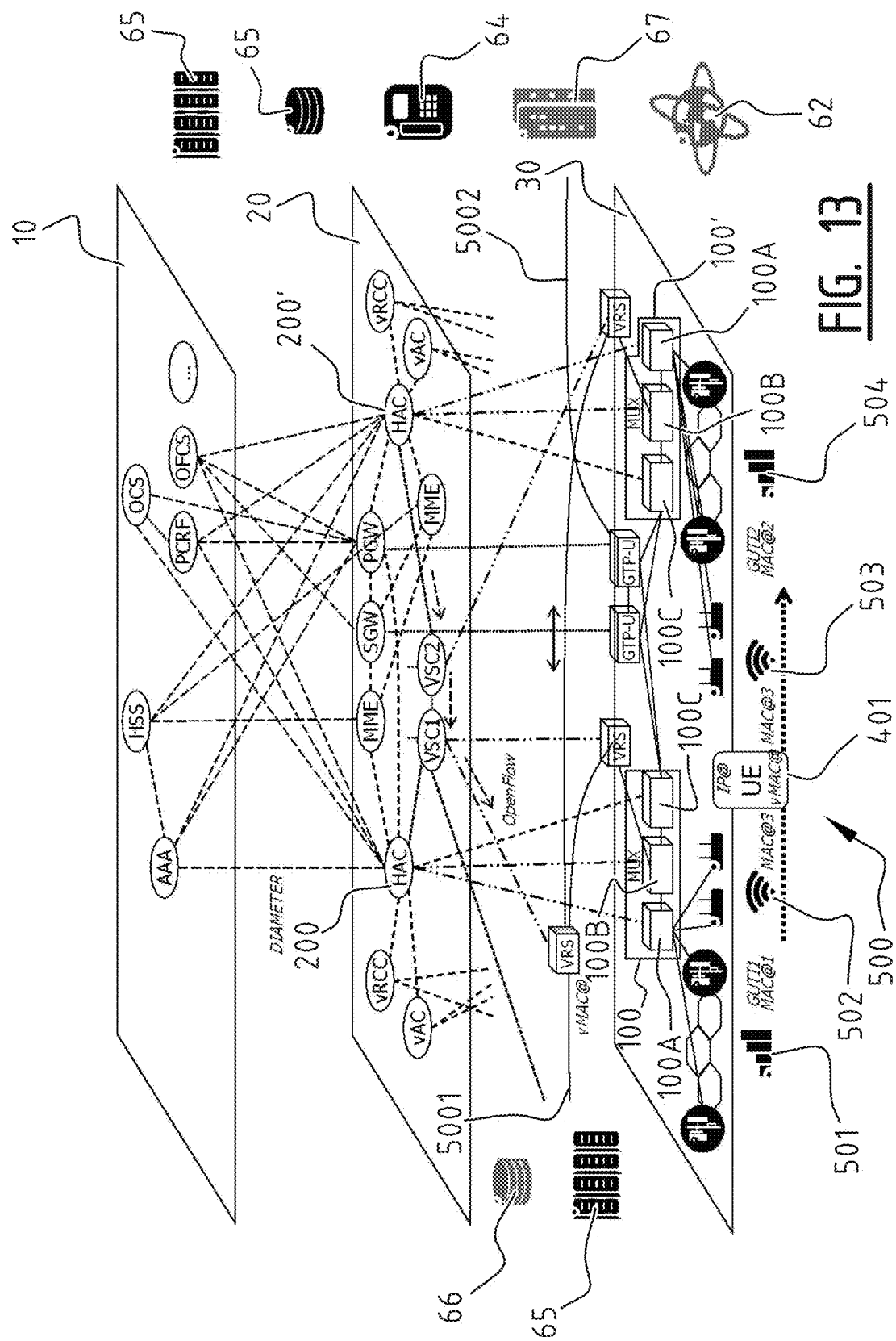
FIG. 13 illustrates schematically another embodiment of the system according to the present invention.

FIG. 13 illustrates schematically another embodiment of the system according to the present invention.

FIG. 13 shows seamless inter-HAC handover 500 of user equipment UE 401 from HAC 100 to HAC 100' through Data-Triggered Authentication, by detecting the sending of OSI layer 2 (L2) frames from a new access network, respectively access networks 501, 502, 503, and 504. In particular, the UE 401 is associated with an IP address (IP@) and a virtual MAC address (vMAC@), which preferably remain associated with it as long as possible to provide long-term reachability. In the cellular access network 501, the UE 401 is represented by a cellular MAC address (MAC@1), which may for example be derived from its GUTI1 address allocated by the higher-level 10. In the non-cellular access network 502, the UE 401 is represented by a non-cellular MAC address (MAC@3), which may for example be (derived from) its built-in hardware or firmware MAC address. In the non-cellular access network 503, UE 401 is again represented by the MAC@3 address, since access network 503 supports this. In cellular access-network 504, the UE 401 is represented by a cellular MAC address (MAC@2), which may for example be derived from its GUTI2 address allocated by the higher-level 10. Thus, handover from and to other access networks is possible, while the UE 401 remains reachable for layer 2 traffic. The figure also shows a number of bridged subnetworks 5001 and a number of routed domains 5002.

Figure 14:
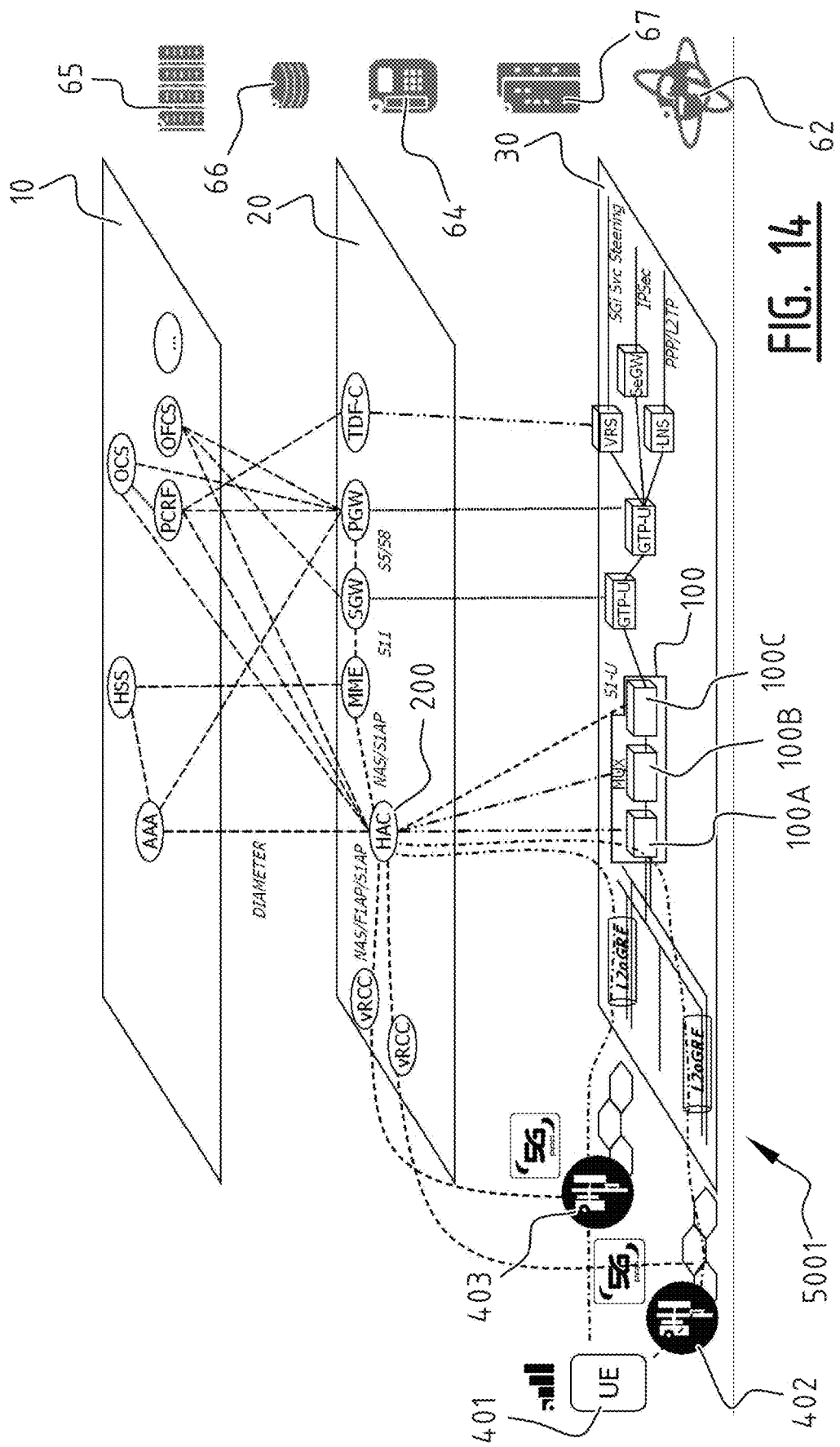
FIG. 14 illustrates schematically another embodiment of the system according to the present invention illustrating routed communication.

FIG. 14 illustrates schematically another embodiment of the system according to the present invention, wherein routed communication is shown, wherein communication happens over domains 5001 that are routed through the core network.

Figure 15:
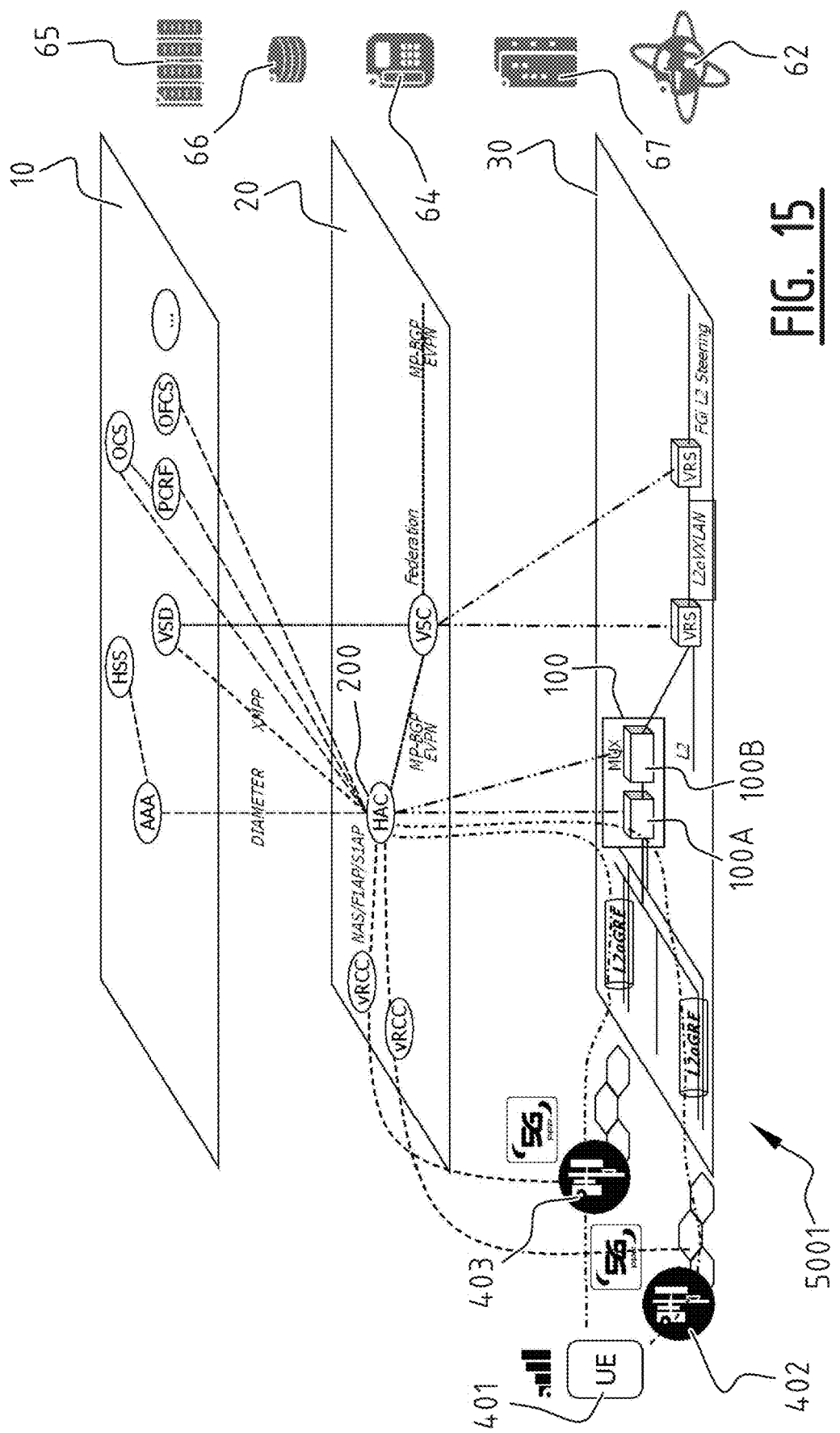
FIG. 15 illustrates schematically another embodiment of the system according to the present invention illustrating bridged communication.

FIG. 15 illustrates schematically another embodiment of the system according to the present invention, wherein native bridged communication is shown, wherein communication happens over bridged domains 5001, thus obviating the core network.

Figure 16:
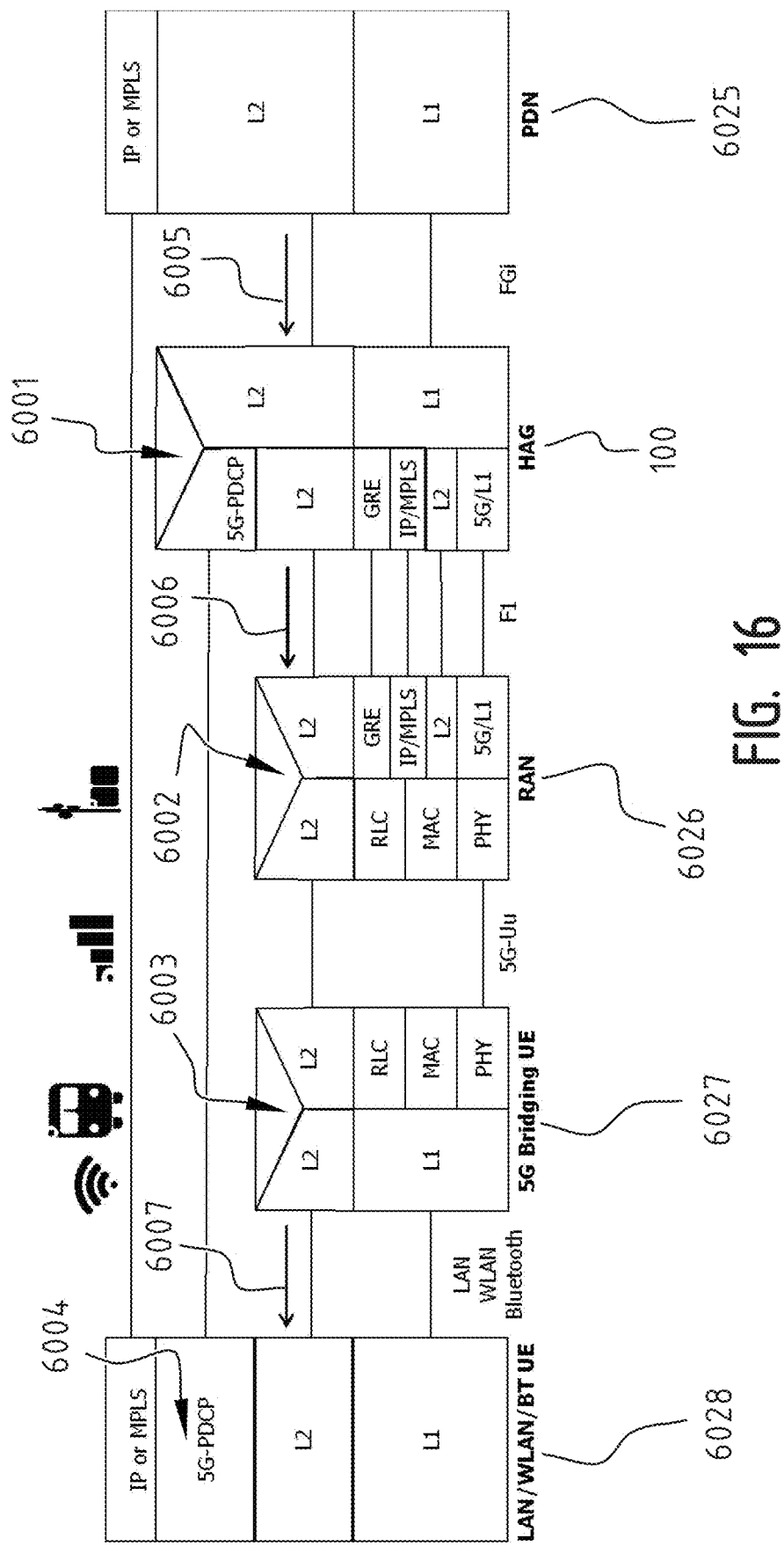
FIG. 16 illustrates schematically a protocol stack for bridging 5G user equipment with a local area network behind the user equipment, using an embodiment of the hybrid access gateway (HAG) 100 according to the present invention.

FIG. 16 illustrates schematically an example protocol stack for bridging 5G user equipment 6027 with a local area network 6028 behind the user equipment 6027, using an embodiment of the hybrid access gateway (HAG) 100 according to the present invention. The HAG 100 is shown connected to the PDN 6025 sending 6005 layer 2 traffic directed to a destination MAC address represented as the UE's virtual MAC address, and to a local area network (LAN/WLAN/ . . . ) 6028 behind a 5G bridging user equipment 6027. The protocol stack shows that 6001 the HAG 100 copies the downlink layer 2 header, encrypts the downlink Ethernet payload into a newly defined 5G-PDCP protocol ($5^{th}$ Generation Protocol Dependent Convergence Protocol), which offers similar functions as 4G-PDCP (Packet Data Convergence Protocol), however for OSI Layer 2 traffic. Transmission further happens of layer 2 traffic 6006 to a destination MAC address represented as the 5G MAC address. The Radio Access Network (RAN) is shown to 6002 compress the downlink layer 2 header, and copy the encrypted layer 2 payload containing the 5G-PDCP packet. The 5G bridging UE is shown to 6003 decompress the layer 2 header, and copy the layer 2 payload. Transmission further happens of layer 2 traffic 6007 from the 5G bridging UE 6027 to the local area network 6028. The UE in the local area network behind the UE is shown to 6004 decrypt the downlink payload (namely the 5G-PDCP packet) and to present it to the IP (Internet Protocol) or MPLS (Multi-Protocol Label Switching) layer. Also, The Control Plane (HAC) authenticates and installs 5G-PDCP ciphering keys in the HAG for each UE on a LAN/WLAN/PAN behind the actual 5G UE.

A person of skill in the art would readily recognize that steps of various above-described methods can be performed by programmed computers. Herein, some embodiments are also intended to cover program storage devices, e.g. digital data storage media, which are machine or computer readable and encode machine-executable or computer-executable programs of instructions, wherein said instructions perform some or all of the steps of said above-described methods. The program storage devices may be, e.g. digital memories, magnetic storage media such as magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer.

Whilst the principles of the invention have been set out above in connection with specific embodiments, it is to be understood that this description is merely made by way of example and not as a limitation of the scope of protection which is determined by the appended claims.

The invention claimed is:

1. A hybrid access gateway apparatus for native bridged communication in a communication network, the hybrid access gateway apparatus comprising:
   an upstream interface configured for receiving downlink open systems interconnection (OSI) layer 2 traffic in said communication network;
   at least one downstream cellular coupling interface configured to be communicatively coupled to a user equipment (UE) represented by an OSI layer 2 address via a cellular access network of said communication network; and
   at least one processor configured to cause the hybrid access gateway to,
      inspect an OSI layer 2 header of said received traffic,
      direct said received traffic to said user equipment via said at least one downstream cellular coupling interface, based on said inspected OSI layer 2 header, and
      store associations between a number of user equipments including said user equipment and a number of OSI layer 2 addresses respectively representing said number of user equipments.

2. The hybrid access gateway apparatus of claim 1, wherein said downstream cellular coupling interface is configured to be communicatively coupled to said user equipment via said cellular access network comprising a shared or common channel or radio access bearer, supporting concurrent access by multiple user equipments.

3. The hybrid access gateway apparatus of claim 1,
   wherein said at least one processor is configured to cause the hybrid access gateway to:
   inspect said OSI layer 2 header by performing 4-tuple shallow frame inspection on a source media access layer (MAC) address, a destination MAC address, a protocol indication, and a bridged subnetwork identification
   wherein said bridged subnetwork identification is an identification of a bridged subnetwork of said communication network, and
   wherein said bridged subnetwork is a virtual network configured to allow inter-UE communication at OSI layer 2 in bridged mode by UE attached to the same bridged subnetwork, and to disallow inter-UE communication at OSI layer 2 in bridged mode by UE attached to a different bridged subnetwork.

4. The hybrid access gateway apparatus of claim 1,
   wherein the user equipment (UE) connected to said cellular access network is identified by an OSI layer 2 address which is derived from a temporary identifier for said UE; and
   wherein the UE is connected to a non-cellular access network of said communication network where the UE is identified by another OSI layer 2 address.

5. A hybrid access controller apparatus for hybrid access control in a communication network, wherein said hybrid access controller is configured for being communicatively coupled to a hybrid access gateway, the hybrid access controller comprising:
   at least one processor configured to control:
   an upstream interface of said hybrid access gateway, the upstream interface configured to receive downlink open systems interconnection (OSI) layer 2 traffic in said communication network;
   at least one downstream cellular coupling interface of said hybrid access gateway, the downstream cellular coupling interface configured to be communicatively coupled to a user equipment represented by an OSI layer 2 address via a cellular access network of said communication network;

said hybrid access gateway configured to inspect an OSI layer 2 header of said received traffic;

said hybrid access gateway configured to direct said received traffic to said user equipment via said at least one downstream cellular coupling interface based on said inspected OSI layer 2 header; and said hybrid access gateway configured to store associations between a number of user equipments including said user equipment and a number of OSI layer 2 addresses respectively representing said number of user equipments.

6. A method for native bridged communication in a communication network by a hybrid access gateway, the method comprising:

receiving downlink open systems interconnection (OSI) layer 2 traffic in said communication network;

communicatively coupling to a user equipment (UE) represented by an OSI layer 2 address via a cellular access network of said communication network;

inspecting an OSI layer 2 header of said received traffic;

directing said received traffic to said user equipment via at least one downstream cellular coupling interface, based on said inspected OSI layer 2 header; and storing associations between a number of user equipments including said user equipment and a number of OSI layer 2 addresses respectively representing said number of user equipments.

7. The method according to claim 6, wherein, wherein said cellular access network includes a shared or common channel or radio access bearer supporting concurrent access by multiple user equipments.

8. The method according to claim 6, comprising:

inspecting said OSI layer 2 header by performing 4-tuple shallow frame inspection on a source media access layer (MAC) address, a destination MAC address, a protocol indication, and a bridged subnetwork identification, wherein said bridged subnetwork identification is an identification of a bridged subnetwork of said communication network, and wherein said bridged subnetwork is a virtual network configured to allow inter-UE communication at OSI layer 2 in bridged mode by UE attached to the same bridged subnetwork, and to disallow inter-UE communication at OSI layer 2 in bridged mode by UE attached to a different bridged subnetwork.

9. The method according to claim 6, wherein the user equipment (UE) connected to said cellular access network is identified by an OSI layer 2 address derived from a temporary identifier for said UE; and wherein the same UE is connected to a non-cellular access network of said communication network where the same UE is identified by another OSI layer 2 address.

10. A non-transitory computer readable medium comprising computer-executable instructions for causing a hybrid access gateway to provide native bridged communication in a communication network by:

receiving downlink open systems interconnection (OSI) layer 2 traffic in said communication network;

communicatively coupling to a user equipment (UE) represented by an OSI layer 2 address via a cellular access network of said communication network;

inspecting an OSI layer 2 header of said received traffic;

directing said received traffic to said user equipment via at least one downstream cellular coupling interface, based on said inspected OSI layer 2 header; and storing associations between a number of user equipments including said user equipment and a number of OSI layer 2 addresses respectively representing said number of user equipments.

\* \* \* \* \*